(12) United States Patent
Nakazawa et al.

(10) Patent No.: US 6,871,989 B2
(45) Date of Patent: *Mar. 29, 2005

(54) MOVABLE REFLECTOR TYPE HEADLAMP HAVING NUT SLIDING GUIDE

(75) Inventors: Hideaki Nakazawa, Shizuoka (JP); Takeyuki Tachiiwa, Shizuoka (JP); Norihiro Nishitani, Shizuoka (JP); Katutada Shirai, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 33 days.

This patent is subject to a terminal disclaimer.

(21) Appl. No.: 10/324,033

(22) Filed: Dec. 20, 2002

(65) Prior Publication Data

US 2003/0117810 A1 Jun. 26, 2003

(30) Foreign Application Priority Data

Dec. 25, 2001 (JP) ............................ P.2001-392242

(51) Int. Cl.[7] .............................................. F21V 14/04
(52) U.S. Cl. .................... 362/515; 362/528; 362/289
(58) Field of Search .............................. 362/459, 487, 362/506, 507, 509, 512, 514, 515, 523, 528, 529, 530, 531, 532, 257, 269, 271, 273, 277, 282, 284, 285, 287, 289, 382, 418, 419, 420, 421, 427, 428

(56) References Cited

U.S. PATENT DOCUMENTS 5,573,326 A * 11/1996 Iijima ........................ 362/528
5,908,239 A * 6/1999 Sugimoto ................... 362/515
5,993,033 A 11/1999 Sugimoto et al.
6,234,655 B1 * 5/2001 Suehiro et al. ............. 362/528
6,280,070 B1 8/2001 Ishida et al.
6,315,438 B1 11/2001 Shirai et al.
6,345,905 B1 2/2002 Kibayashi et al.
6,637,919 B2 * 10/2003 Shirai ........................ 362/515

FOREIGN PATENT DOCUMENTS

JP  2001-351407  12/2001
JP  2002-193024   7/2002

* cited by examiner

Primary Examiner—John Anthony Ward
Assistant Examiner—Ismael Negron
(74) Attorney, Agent, or Firm—Sughrue Mion, PLLC

(57) ABSTRACT

A headlamp includes a lamp housing defining a lamp body and a front lens. A reflector is accommodated in the lamp housing and a light source is attached thereto. An aiming mechanism tiltably supports the reflector relative to the lamp body, and includes an aiming fulcrum, aiming screws, and nut members attached to the reflector. The nut members are guided by sliding guides in the lamp body, and stress releasing devices having a ball-and-socket joint structure are provided in an attachment portion of the nut members and brackets. A ball portion of a ball-and-socket joint is formed in a nut member body itself provided with a female screw portion, a slider supported by the sliding guides is formed integrally with a side of the ball portion, and the ball portion is supported on a ball receiving portion of bearings attached to the brackets.

10 Claims, 23 Drawing Sheets

US 6,871,989 B2

MOVABLE REFLECTOR TYPE HEADLAMP HAVING NUT SLIDING GUIDE

BACKGROUND OF THE INVENTION

1. Field of the Invention

The present invention relates to a reflector movable type headlamp for a vehicle in which a reflector having a light source attached thereto is tiltably supported on a lamp body by an aiming mechanism. More particularly, the invention relates to a reflector movable type headlamp for a vehicle having an aiming mechanism with structure such that a nut member used as an aiming point component is supported by a nut sliding guide formed in the lamp body.

2. Description of the Related Art

In a related art reflector movable type headlamp for a vehicle, a reflector formed of a synthetic resin having a light source attached integrally therewith is supported by an aiming mechanism. The aiming mechanism is constituted by one ball-and-socket joint to be a tilt fulcrum and two nut members to be moving fulcrums which can be screwed into two aiming screws and can advance and retreat in an axial direction respectively on the front side of a lamp body 1 formed of a synthetic resin as shown in FIG. 30.

More specifically, an aiming screw 4 is rotatably supported on a screw insertion hole 1a provided in the lamp body 1, and a nut member 5 formed of a synthetic resin, which is attached to a bracket 2a extended and formed in the reflector, 2 is screwed into a screw portion 4a of the aiming screw 4 extended forward from the lamp body 1. When the aiming screw 4 is rotated, the nut member 5 advances or retreats along the aiming screw 4 so that the reflector 2 is tilted around a tilt axis connecting the ball-and-socket joint and the nut member to be screwed into the other aiming screw. Consequently, the optical axis of the lamp can be regulated.

The aiming screw 4 is formed of metal and has a rear end with which a cap-shaped gear 7 is integrated, and the aiming screw 4 can be rotated by using a driver D. Moreover, the aiming screw 4 inserted into the screw insertion hole 1a from the rear part of the lamp body 1 is elastically supported in a longitudinal direction by a push-on-fix 8 formed of metal and is positioned and fixed.

Further, an O-ring 9 to be a seal member is provided in the screw insertion hole 1a rotatably supporting the aiming screw 4, in part for waterproofing purposes in the rotating support portion of the aiming screw 4.

In a headlamp comprising the aiming mechanism having such a structure, however, there is a possibility that a weight W of the reflector 2 might act on the tip portion of the aiming screw 4 cantilevered by the screw insertion hole 1a. As such, the aiming screw 4 might be rocked with respect to the screw insertion hole 1a to vibrate the reflector 2. Therefore, the aiming screw 4 is strongly pressed and held in the peripheral edge portion of the screw insertion hole 1a by means of the push-on-fix 8 formed of metal, thereby preventing the rocking motion of the aiming screw 4 (the vibration of the reflector 2).

However, there is a problem in that the rotating property of the aiming screw 4 is deteriorated which can make carrying out an aiming operation difficult if the force for holding the aiming screw 4 by the push-on-fix 8 is increased.

Therefore, the applicant has proposed JP-A-2000-165437 (filed in Jun. 2, 2000). As shown in FIG. 31, at the side of a nut member body 5 provided with a female screw portion to be screwed into the aiming screw 4, a nut member has such a structure that an engagement projection 6 to be an attachment portion to a bracket 2a on the reflector 2 side and a slider portion 7 to be a slide engagement portion with a sliding guide 8 provided in a lamp body 1 are integrally formed orthogonally as seen from the front, and the slider portion 7 is supported and carried by the sliding guide 8 so that a weight load on the reflector 2 side acting on the aiming screw 4 is relieved to suppress the rocking motion (vibration) of the reflector 2. The reference numeral 9 denotes a front lens, the symbol a denotes an aiming fulcrum, the symbol Lx denotes a horizontal tilt axis, and the symbol Ly denotes a vertical tilt axis.

In the related art (JP-A-2000-165437) described above, however, the weight load on the reflector 2 side is carried by the sliding guide 8. Therefore, while the weight load on the reflector 2 side does not act as a bending moment on the aiming screw 4, a torsional moment is generated on the nut member by an inertial weight on the reflector side acting on the engagement projection 6 which is offset and provided on the side of the nut member body 5 screwed into the aiming screw 4. As such, it may become difficult to reliably suppress the vibration of the reflector. Moreover, there has also been proposed a problem in that the nut member might be freely rotated with respect to the aiming screw so that proper aiming cannot be carried out when the torsional moment repetitively acts on the nut member as shown in the open arrows of FIG. 31.

In addition, there is also a problem in that the nut member takes a T-shape or an L-shape seen from the front and therefore can be bulky, resulting in an increase in the size of the lamp body.

In order to solve the various problems described above, therefore, the applicant has proposed JP-A-2000-400085 (tiled on Dec. 28, 2000). In this application, a nut member itself to be screwed into an aiming screw constitutes a ball portion 5a, and an engagement hole 2b constituting a ball receiving portion is formed on a bracket 2a on the reflector side as shown in FIG. 32.

In JP-A-2000-400085, however, the various problems can be solved and the ball receiving portion (engagement hole) 2b is provided on the bracket at the reflector side. For this reason, the structure of the bracket and that of a mold for reflector molding are complicated so that there is a new problem in that a manufacturing cost is increased correspondingly,

SUMMARY OF THE INVENTION

The invention has been made in consideration of the problems of the related art, and has an object to provide a compact reflector removable type headlamp for a vehicle which can reliably prevent the vibration of a reflector, can maintain the smooth rotation of an aiming screw, and furthermore, can prevent the shape of the reflector and the structure of a mold for reflector molding from being complicated.

In order to achieve the above object, a first aspect of the invention is directed to a reflector movable type headlamp for a vehicle comprising:

a lamp body including a screw insertion hole;

a front lens assembled into a front opening of the lamp body in order to constitute a lamp housing;

a reflector accommodated in the lamp housing; and an aiming mechanism to tiltably support the reflector with respect to the lamp body, the aiming mechanism including;
  an aiming fulcrum forming a tilt fulcrum of the reflector, an aiming screw supported rotatably on the screw insertion hole, and a nut member attached to a bracket on a reflector side, screwed into the aiming screw and longitudinally advancing and retreating in cooperation with rotation of the aiming screw;
  a nut sliding guide extended in parallel with the aiming screw to carry and support the nut member slidably in a longitudinal direction being extended integrally with the lamp body,
  an attachment portion of the nut member constituting an aiming point and the bracket being provided with stress releasing means having a ball-and-socket joint structure for releasing a stress generated in the attachment portion with advance and retreat of the nut member,
  wherein the nut member has such a structure that a nut member body itself provided with a female screw portion constitutes a ball portion of the ball-and-socket joint structure and a slider to be supported by the nut sliding guide is formed integrally in a position offset toward a side of the nut member body; and
  a bearing attached to the bracket and provided with a longitudinal through hole for avoiding an interference of a ball receiving portion for supporting the ball portion with the aiming screw.

(Function) The nut sliding guide formed integrally with the lamp body carries (the weight of the reflector acting on) the nut member to be screwed into the aiming screw. Therefore, a bending moment based on the weight of the reflector does not act on the aiming screw. Consequently, the rocking motion of the aiming screw with respect to the screw insertion hole, that is, the vibration of the reflector, is suppressed. Therefore, it is possible to further reduce the force for holding the aiming screw in the rotating support portion which is generated by the push-on-fix than that in the related art, thereby maintaining the smooth rotation of the aiming screw.

Moreover, the action point of a weight on the reflector side for the nut member is coincident with the screwed portion of the nut member and the aiming screw. Therefore, a torsional moment caused by the weight on the reflector side does not act on the nut member. Consequently, there is no fear that the reflector might be vibrated or the nut member might be rotated freely with respect to the aiming screw.

Furthermore, when the reflector is tilted with respect to the lamp body or is thermally expanded due to the heat generation of a light source, a stress to be generated in the attachment portion of the nut member and the bracket (between the aiming screw and the reflector) is released by the stress releasing means having the ball-and-socket joint structure provided in the attachment portion of the nut member and the bracket (a ball-and-socket joint constituted by the ball portion of the nut member and the ball receiving portion of the bearing attached to the bracket).

The stress generated in the attachment portion between the bracket and the bearing due to a difference in a moving track between the tilt of the reflector (a circular motion around a tilt center axis) and the advance and retreat of the nut member (a straight-line motion along the aiming screw) can be controlled by providing a clearance between the bearing insertion hole of the bracket and the bearing in which the bearing can slide in a load acting direction.

Moreover, the nut member to advance and retreat in a longitudinal direction with the rotation of the aiming screw is guided in a direction along the aiming screw by a nut sliding guide. Consequently, the friction torque of the screwed portion of the nut member and the aiming screw is held to be constant.

Furthermore, the nut sliding guide is provided in (a large space position between the lamp body and the reflector to be) the position in which the nut sliding guide is offset toward the side of the aiming screw installation position. Consequently, it is possible to avoid the interference of the tilting reflector with the nut sliding guide.

Moreover, since the nut member has such a compact structure that the slider portion is formed integrally with the side of the nut member body, it can be correspondingly provided in a small space between the lamp body and the reflector.

Furthermore, the ball receiving portion (engagement hole) is not directly formed in the bracket on the reflector side, but is preferably formed in the compact bearing to be attached to the bracket on the reflector side. Consequently, it is easy to constitute the bearing having the ball receiving portion by a molded member formed of a resin. Also, it is preferable that the bracket be formed to have such a simple shape as to attach the bearing. Therefore, the structure of the reflector having the bracket formed integrally therewith is not complicated and a mold structure for molding or casting can be simplified in the cases of both a reflector formed of a resin and a reflector formed of aluminum.

A second aspect of the invention is directed to the reflector movable type headlamp for a vehicle according to the first aspect of the invention, where in the ball receiving portion of the bearing is formed to have a U-shaped longitudinal section opened to a side, the slider is provided through a bar-shaped extended portion extended to the side of the nut member body, an elastic hook to be engaged with a peripheral edge portion of a hole provided on a bottom of the ball receiving portion (a lateral bar-like portion having a U-shaped section) to prevent the nut member from slipping off from the bearing is extended on an opposite side to a side on which the slider is formed with the female screw portion of the nut member body itself interposed therebetween, and the nut member is pressed from the elastic hook side into the ball receiving portion so that the ball portion to be the nut member body can be engaged with and held in the ball receiving portion of the bearing.

(Function) When the nut member is pressed from the elastic hook side into the opening on the side of the ball receiving portion, the elastic hook is engaged with the peripheral edge portion of the hole provided on the bottom of the ball receiving portion (a lateral bar-like portion having a U-shaped section) so that the nut member can be prevented from slipping off from the bearing and the ball portion is held in such a configuration as to be supported on the ball receiving portion.

Since the slider is provided just beside the nut member body, it is possible to reduce a length in a longitudinal direction of the whole nut member.

A third aspect of the invention is directed to the reflector movable type headlamp for a vehicle according to the second aspect of the invention, wherein a spherical inner peripheral surface to be matched with a spherical outer peripheral surface of the ball portion of the nut member body is formed on an inside of the ball receiving portion, and a gate rib fitted movably in a direction of a groove width in a groove extended in a press direction of the nut member formed on the inside of the ball receiving portion and coming in pressure contact in a direction of a groove depth is protruded across the female screw portion in an opposed position orthogonal to an extending longitudinal direction of the elastic hook on an outer side surface of the nut member body and interposing the female screw portion therebetween. This configuration allows for preventing relative rotation of the ball receiving portion and the ball portion around a center axis of the female screw portion.

(Function) The outer surface of the horizontal beam portion of the gate rib is pressed in contact with the bottom face of the groove formed on the inside of the ball receiving portion so that the relative rotation between the ball receiving portion and the ball portion around the center axis of the female screw portion is blocked. Consequently, a looseness of the reflector in the lateral direction of the slider is not generated. For this reason, the reflector is supported without a looseness in a transverse direction with respect to the slider if the slider of the nut member is supported on the sliding guide formed on the upper side wall or lower side wall of the lamp body, and the reflector is supported without a looseness in a vertical direction with respect to the slider if the nut member is supported on the sliding guide formed on the left side wall or right side wall of the lamp body.

The gate rib and the groove are movably fitted in the lateral direction of the groove so as not to hinder the rotation of the ball receiving portion and the ball portion around an elastic hook extending longitudinal axis (Y axis).

In particular, the outer surface of the horizontal beam portion in the gate rib and the bottom face of the groove on the inside of the ball receiving portion with which the outer surface of the horizontal beam portion comes in sliding contact have circular arc-shaped cross sections. Consequently, the relative rotation of the ball portion and the ball receiving portion around the elastic hook extending longitudinal axis (Y axis) can be carried out smoothly.

A fourth aspect of the invention is directed to the reflector movable type headlamp for a vehicle according to the third aspect of the invention, wherein the slider is provided behind the nut member body to be the ball portion through an L-shaped extended portion, and the bearing is formed by a hollow container member provided, on a rear end side, with a ball receiving portion for preventing the ball portion from slipping off, reducing a diameter rearward and being thus opened to be movably fitted in the L-shaped extended portion of the nut member, and is constituted by a pair of division molded members which are obtained by a longitudinal division along a longitudinal through hole of the hollow container member and can be integrated as the bearing by matching divided surfaces with each other.

(Function) The ball portion is held between the division molded members and is thus integrated. Consequently, the ball portion can be prevented from slipping off from (a rear opening having a diameter reduced in) the ball receiving portion, and furthermore, is held to have such a configuration as to be supported on the ball receiving portion.

Since the extended portion connecting the nut member and the slider is provided behind the nut member body, the whole nut member body can act as the ball portion so that a large sliding contact surface can be correspondingly maintained in (the ball portion and the ball receiving portion of) the ball-and-socket joint. Moreover, the slider is provided behind the nut member body through the L-shaped extended portion. As compared with the nut member according to the second aspect of the invention, therefore, a length in a longitudinal direction is slightly increased and a length from the nut member body to the slider (a length in the lateral direction of the nut member) can be reduced because a hook for slip-off stop is not provided on the side.

A fifth aspect of the invention is directed to the reflector movable type headlamp for a vehicle according to the fourth aspect of the invention, wherein respective front ends of the division molded members are coupled to each other through a thin hinge, and a concavo-convex lance engagement portion for integrating the division molded members as the bearing is provided on the corresponding matched surfaces of the division molded members.

(Function) A pair of division molded members are connected to each other through a thin hinge and are integrated as a bearing, which is convenient for handling. Moreover, if the division molded members are rotated around the hinge and are thus mated with each other, a concavo-convex lance engagement portion is automatically engaged and is integrated as a bearing. Once the concavo-convex lance engagement portions of the division molded members are engaged and integrated as the bearing, the division molded members cannot easily be separated from each other so that there is no fear that the ball portion might be separated from the ball receiving portion.

A sixth aspect of the invention is directed to the reflector movable type headlamp for a vehicle according to any of the first to fifth aspects of the invention, wherein the aiming screw is constituted by a pair of left and right aiming screws separated from each other above the aiming fulcrum provided therebelow and separated from each other in a transverse direction, and the aiming fulcrum is constituted to advance and retreat in a longitudinal direction by means of an actuator for autoleveling.

(Function) The aiming fulcrum is moved in the longitudinal direction by the driving operation of the actuator. Consequently, the reflector is tilted around a leveling axis (an axis passing through left and right aiming points) and the optical axis of the headlamp (reflector) is changed in a vertical direction. Then, a tilt in the longitudinal direction of an axle is detected by a center-of-gravity movement detecting sensor for detecting a movement in the longitudinal direction of the center-of-gravity position of a vehicle, for example, and the actuator is driven based on a detection value. More specifically, the reflector is regulated to be tilted (autoleveled) automatically such that the optical axis of the headlamp (reflector) is always constant with respect to the axle.

Moreover, when a pair of left and right aiming screws are rotated, the respective nut members advance and retreat along the aiming screw and the reflector is tilted around a virtual horizontal tilt axis passing through the aiming point. Moreover, in the case in which the aiming fulcrum is provided under one of the left and right aiming points (aiming screws), the nut member advances and retreats along the aiming screw when the aiming screws to be separated in a transverse direction from the aiming fulcrum are rotated, and the reflector is tilted around a vertical tilt axis passing through the aiming fulcrum and an attachment portion between the nut member to be screwed into the other aiming screw positioned thereabove and the bracket.

When the reflector is tilted with respect to the lamp body during the autoleveling or the aiming or when the reflector is thermally expanded due to the heat generation of the light source, a stress to be generated in the attachment portion of the nut member and the bracket (between the aiming screw and the reflector) is released by the stress releasing means having a ball-and-socket joint structure provided in the attachment portion of the nut member and the bracket (a ball-and-socket joint constituted by the ball portion of the nut member and the ball receiving portion of the bearing attached to the bracket).

In the sixth aspect of the invention, moreover, there is provided the autoleveling function. In so-called dynamic autoleveling in which the rotation between the ball portion of the nut member and the ball receiving portion of the bearing is often carried out, and particularly, the autoleveling is always carried out regardless of the stop and running of a vehicle, therefore, the rotation between the ball portion and the ball receiving portion is carried out more often and the sliding contact surface is apt to be abraded correspondingly. In particular, the nut member is generally formed of engineering plastic having an excellent sliding property, and furthermore, the reflector is generally constituted by a resin such as BMC having an excellent rigidity. In such a case, in the related art (JP-A-2000-400085), there is a possibility that an outer surface on the ball portion side might be scraped by a mixed fiber exposed to an inner surface on the engagement hole side to hinder a smooth motion between the ball portion and the ball receiving portion (engagement hole) over the sliding contact surface of the ball portion of the nut member (engineering plastic) and the engagement hole formed on the bracket (a fiber mixed resin such as BMC). In the sixth aspect of the invention, however, the bearing attached to the bracket and serving to support the ball portion of the nut member may be formed of the engineering plastic. Consequently, the abrasion in the ball portion and the ball receiving portion which are often rotated is rarely generated so that the smooth rotation can be guaranteed for a long period of time.

A seventh aspect of the invention is directed to the reflector movable type headlamp for a vehicle according to any of the first to fifth aspects of the invention, wherein the aiming screw is constituted by a vertical aiming screw provided in a position placed apart from the aiming fulcrum in a vertical direction and a transverse aiming screw provided in a position placed apart from the aiming fulcrum in a transverse direction.

(Function) The nut member advances and retreats along the upper and lower aiming screws by the rotation of the vertical aiming screws, and the reflector is tilted around the horizontal tilt axis passing through the aiming fulcrum and the transverse aiming point (the attachment portion between the nut member to be screwed into the left and right aiming screws and the bracket) The nut member advances and retreats along the left and right aiming screws by the rotation of the left and right aiming screws, and the reflector is tilted around the vertical tilt axis passing through the aiming fulcrum and the vertical aiming point (the attachment portion between the nut member to be screwed into the upper and lower aiming screws and the bracket).

Then, when the reflector is tilted with respect to the lamp body during the aiming or when the reflector is thermally expanded due to the heat generation of the light source, a stress to be generated in the attachment portion of the nut member and the bracket (between the aiming screw and the reflector) is released by the stress releasing means having a ball-and-socket joint structure provided in the attachment portion of the nut member and the bracket (a ball-and-socket joint constituted by the ball portion of the nut member and the ball receiving portion of the bearing attached to the bracket).

Moreover, the nut sliding guide corresponding to the transverse aiming point mainly carries the weight of the reflector and suppresses the vibration in the vertical direction of the reflector. Moreover, the nut sliding guide corresponding to the vertical aiming point suppresses the vibration in the transverse direction of the reflector.

In the reflector movable type headlamp for a vehicle according to any of the aspects of the invention, moreover, the aiming screw may be constituted by a synthetic resin and the screw insertion hole is constituted by the cylindrical portion formed integrally with the lamp body and extended forward through the lamp body, and furthermore, an elastic engagement portion capable of being elastically deformed inward in a radial direction to pass through the screw insertion hole and being engaged with the peripheral edge portion on the front end side of the screw insertion hole to prevent the aiming screw from rearward slipping off may be integrally formed on the front end side of a supported portion to be supported by the screw insertion hole of the aiming screw, while a skirt-shaped elastic rib for positioning and fixing the aiming screw in the longitudinal direction may be integrally formed in pressure contact with the peripheral edge portion on the rear end side of the screw insertion hole at the rear end side of the supported portion.

By such a structure, when the aiming screw is pushed into the screw insertion hole from the back of the lamp body, the elastic engagement portion of the supported portion in the aiming screw is pushed against the peripheral edge portion on the rear end side of the screw insertion hole and is thus deformed elastically to reduce a diameter inward in the radial direction and to pass through the cylindrical portion, and the elastic engagement portion is engaged with the peripheral edge portion on the front end side and the skirt-shaped elastic rib comes in pressure contact with the peripheral edge portion on the rear end side of the screw insertion hole. Consequently, the aiming screw is positioned and fixed in the axial direction with respect to the screw insertion hole.

Moreover, the skirt-shaped elastic rib formed on the rear end side of the supported portion of the aiming screw comes in pressure and sliding contact with the peripheral edge portion of the screw insertion hole and thus blocks the invasion of water into the aiming screw supported portion more or less, and furthermore, elastically supports the aiming screw in a longitudinal direction.

Furthermore, both the elastic rib and the lamp body are formed of a synthetic resin and their sliding motions are maintained in the sliding contact portion between the elastic rib and the peripheral edge portion of the screw insertion hole so that the rotation of the aiming screw is not hindered. In addition, the elastic rib formed of a synthetic resin is deteriorated by the water with more difficulty than an O-ring formed of a rubber.

As a result, by the skirt-shaped elastic rib formed integrally with the aiming screw and coming in pressure and shielding contact with the peripheral edge portion of the screw insertion hole, the aiming screw is elastically supported steadily in a longitudinal direction in the rotating support portion and the waterproof in the rotating support portion of the aiming screw is maintained to some extent. Therefore, it is not necessary to provide an elastic member such as a push-on-fix or a seal member such as an O ring in the rotating support portion of the aiming screw. Correspondingly, the number of components constituting the aiming mechanism is decreased so that the structure of the aiming mechanism can be simplified and a work for assembling the aiming mechanism can also be carried out easily.

Moreover, the elastic rib formed of a synthetic resin is not deteriorated by the water irrespective of use for a long period of time, and it is possible to guarantee the elastic support for a long period of time and some waterproof in the rotating support portion of the aiming screw.

Furthermore, it is also possible to employ such a structure that a circular elastic waterproof rib coming in sliding contact with the inner peripheral surface of the screw insertion hole is formed integrally with the supported portion of the aiming screw.

By such a structure, the circular elastic waterproof rib formed in the supported portion of the aiming screw and coming in sliding contact with the inner peripheral surface of the screw insertion hole is held in a pressure contact state with the inner peripheral surface of the screw insertion hole, thereby maintaining the waterproof in the rotating support portion of the aiming screw.

Moreover, the waterproof rib formed of a synthetic resin has an elasticity (a flexibility). Therefore, when the supported portion of the aiming screw is to be inserted into the cylindrical portion (the screw insertion hole), the elastic waterproof rib is elastically deformed so as not to hinder the assembly of the aiming screw into the screw insertion hole, and the sliding contact portion between the elastic waterproof rib and the inner peripheral surface of the screw insertion hole does not disturb the rotation of the aiming screw.

Furthermore, the elastic waterproof rib formed of a synthetic resin is deteriorated by the water with more difficulty than the O ring formed of a rubber.

As a result, the rotating support portion of the aiming screw can take the waterproof in two portions, that is, waterproof means using the elastic rib in the peripheral edge portion of the screw insertion hole on the outside of the lamp body and waterproof means using the elastic waterproof rib on the inside of the screw insertion hole. Therefore, it is possible to reliably maintain the waterproof in the rotating support portion of the aiming screw correspondingly.

DETAILED DESCRIPTION OF THE INVENTION

Figure 1:
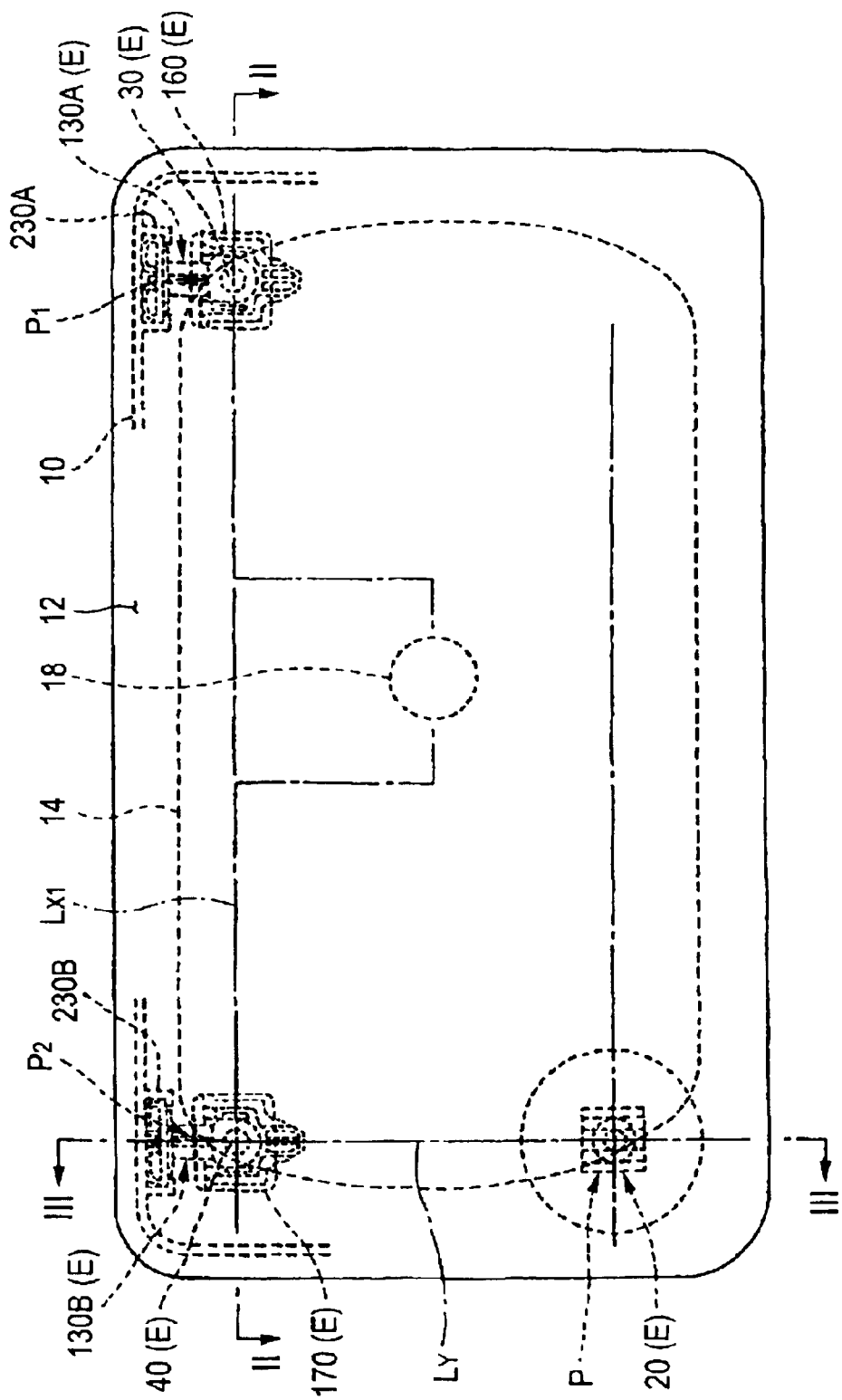
FIG. 1 is a front view showing a headlamp for a vehicle according to a first embodiment of the invention.
Figure 2:
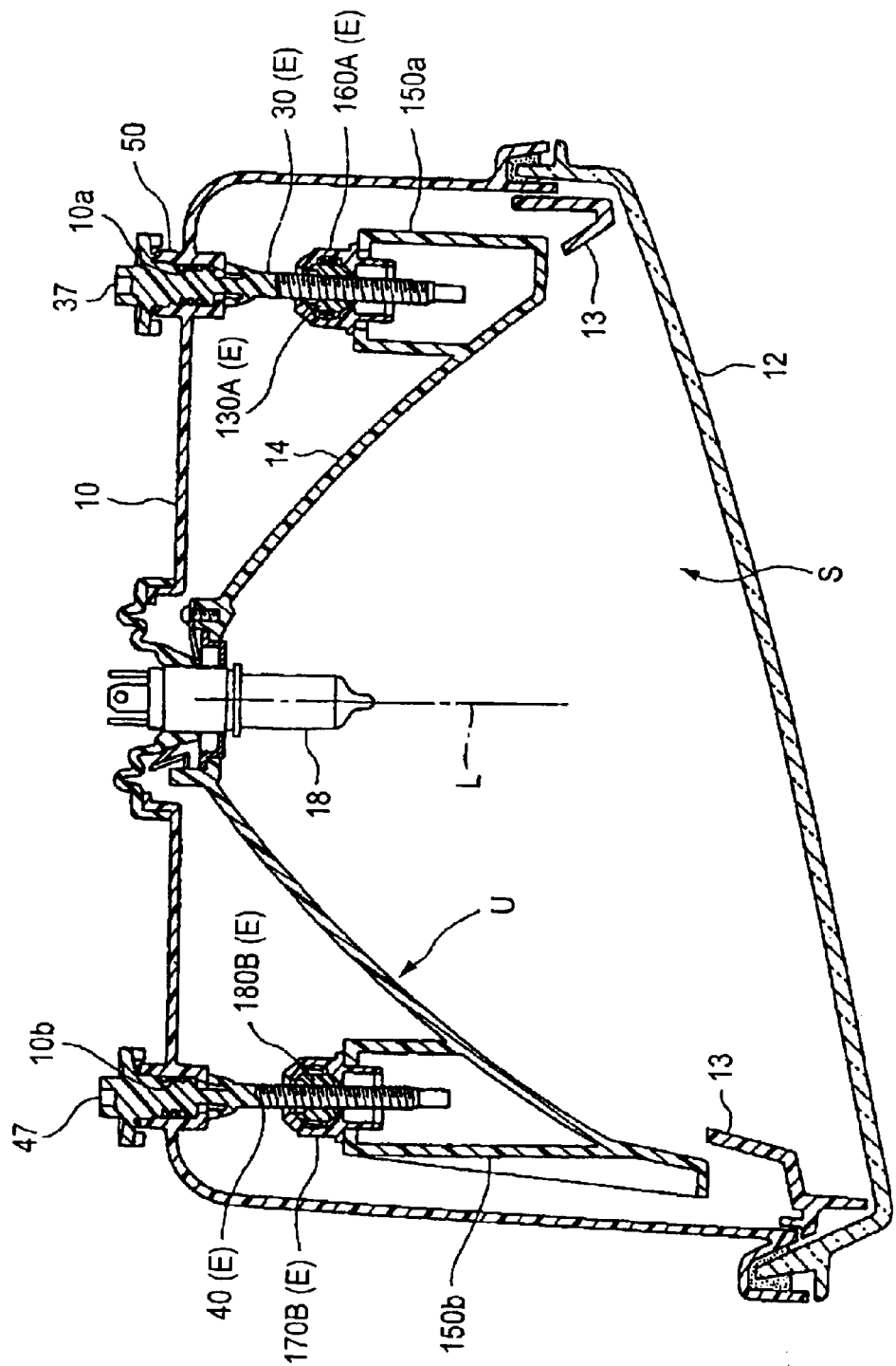
FIG. 2 is a horizontal sectional view illustrating the headlamp (a sectional view taken along a line II—II shown in FIG. 1)

FIGS. 1 to 16 show a first embodiment of the invention. In these drawings, the reference numeral 10 denotes a container-shaped lamp body formed of a polypropylene resin and a front lens 12 is assembled into the front opening of the lamp body 10, thereby constituting a lamp housing S. A light source unit U having a halogen bulb 18 to be a light source inserted integrally with a reflector 14 taking the shape of a paraboloid and formed of a synthetic resin is provided in the lamp housing S to be tiltable by an aiming mechanism E. The reference numeral 13 denotes an extension reflector which is provided between the reflector 14 and the front lens 12 and serves to conceal a clearance between the reflector 14 and the lamp body 10 and to cause the whole inside of the lamp housing S to appear to have a mirror color.

The aiming mechanism E comprises a ball-and-socket joint 20 constituting an aiming fulcrum P which is provided between the lamp body 10 and the reflector 14, a pair of aiming screws 30 and 40 supported rotatably on screw insertion holes 10a and 10b provided in the lamp body 10 respectively and extended forward, bearings 160A and 160B attached to brackets 150a and 150b protruded toward the back side of the reflector 14 respectively, and a pair of nut members 130A and 130B formed of a synthetic resin which are screwed into screw portions 32 and 42 of the aiming screws 30 and 40 and are supported on the bearings 160A and 160B to constitute aiming points P1 and P2, respectively.

As shown in FIG. 1, a pair of aiming screws 30 and 40 constituting the aiming points P1 and P2 (a pair of nut members 130A and 130B) are provided in positions opposed transversely above the bulb 18 with the bulb 18 interposed therebetween, and the aiming fulcrum P is provided under the aiming point P2 on the left corner as seen from the front of the lamp.

Figure 3:
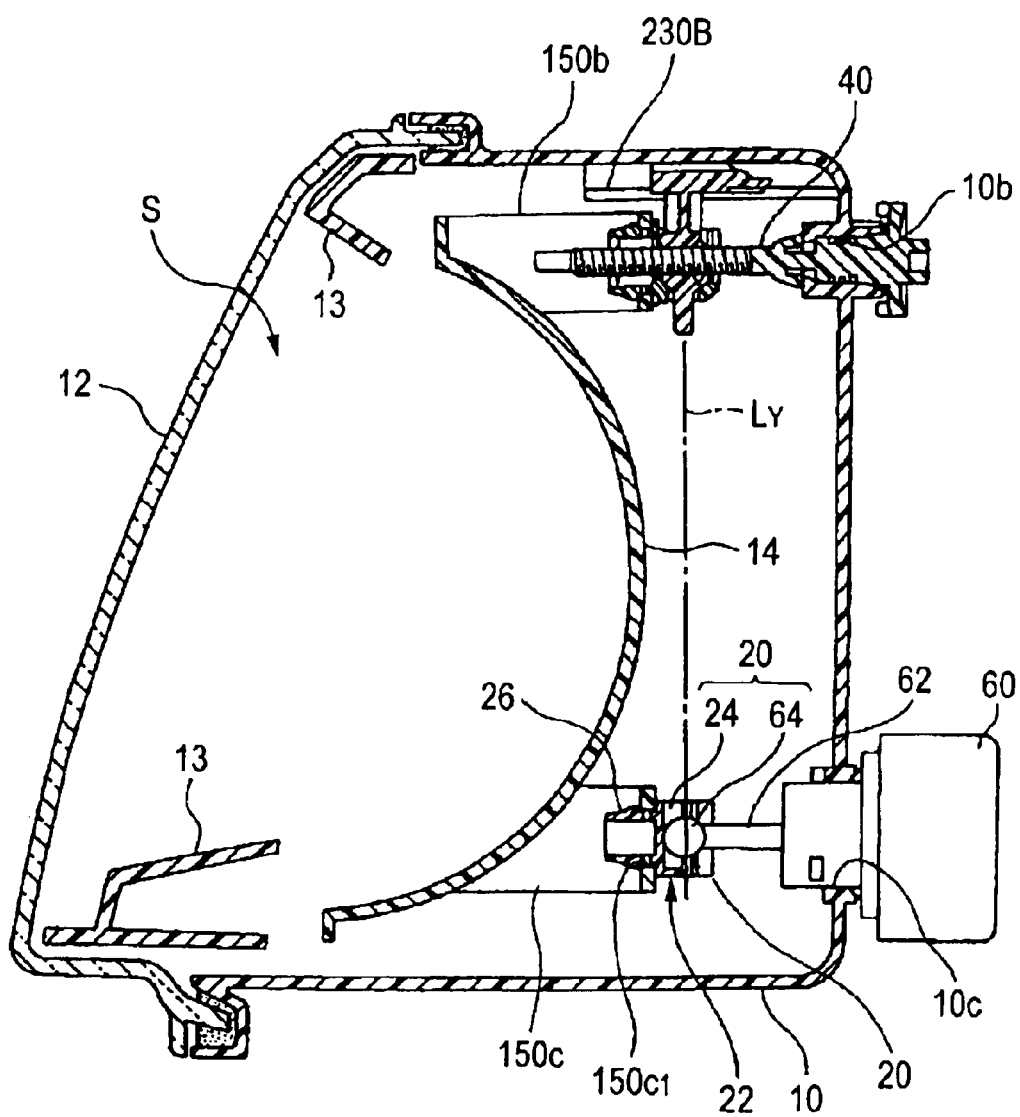
FIG. 3 is a longitudinal sectional view illustrating the headlamp (a sectional view taken along a line III—III shown in FIG. 1)

The reference numeral 22 in FIG. 3 denotes a bearing formed of a synthetic resin (engineering plastic) attached to a bracket 150c protruded from the back face of the reflector 14, and a front end ball portion 64 of a moving rod 62 of an actuator 60 for autoleveling which is attached to the lamp body 10 is supported on the bearing 22. More specifically, the ball-and-socket joint 20 is constituted by the front end ball portion 64 of the moving rod and the bearing 22.

The reference numeral 230A (230B) denotes a nut sliding guide having a dovetail groove structure which is formed integrally with the lamp body 10 and the nut member 130A (130B) to be screwed into the aiming screw 30 (40) is carried and guided by the sliding guide 230A (230B) and can thus perform advance and retreat operations in a longitudinal direction.

When the aiming screw 30 is rotated, (the vertical and transverse aiming point P1 to be an engagement portion between the bearing 160A) the nut member 130A advances and retreats along the screw portion 32 of the aiming screw 30, and the reflector 14 is tilted around a vertical tilt axis Ly connecting the aiming fulcrum P (the ball-and-socket joint 20) and (the vertical aiming point P2 to be an engagement portion between the bearing 160B and) the nut member 130. Furthermore, when the aiming screw 40 is also rotated in the same direction as the aiming screw 30, (the vertical aiming point P2 to be the engagement portion between the bearing 160B and) the nut member 130B also advances and retreats along the screw portion 42 of the aiming screw 40 so that the reflector 14 is tilted around a virtual horizontal tilt axis (a parallel axis with an axis connecting the vertical aiming point P2 to the vertical and transverse aiming point P1) Lx passing through the aiming fulcrum P (the ball-and-socket joint 20). More specifically, the aiming screw 30 constitutes the vertical and transverse aiming screws for regulating the tilt of the optical axis of the lamp around the tilt axes Lx and Ly, and the aiming screw 40 constitutes the vertical aiming screw for regulating the tilt of the optical axis of the lamp around the tilt axis Lx.

By the driving operation of the actuator 60 for autoleveling, moreover, the reflector 14 is tilted around a leveling axis Lx1 connecting the vertical aiming point P2 and the vertical and transverse aiming point P1 and the tilt of an optical axis L of the lamp (reflector) is thus regulated automatically in a vertical direction corresponding to the running state of a vehicle.

More specifically, the actuator 60 causes the moving rod 62 to advance or retreat and moves the position of the ball-and-socket joint 20 (the engagement portion between the ball portion 64 and the ball receiving portion 24) to be the aiming fulcrum longitudinally based on a signal sent from a center-of-gravity movement detecting sensor (not shown) for detecting the movement of the center-of-gravity position of a vehicle in a longitudinal direction, for example, and tilts the reflector 14 around the leveling axis Lx1 to always maintain the optical axis L of the lamp to be constant with respect to an axle.

Figure 9:
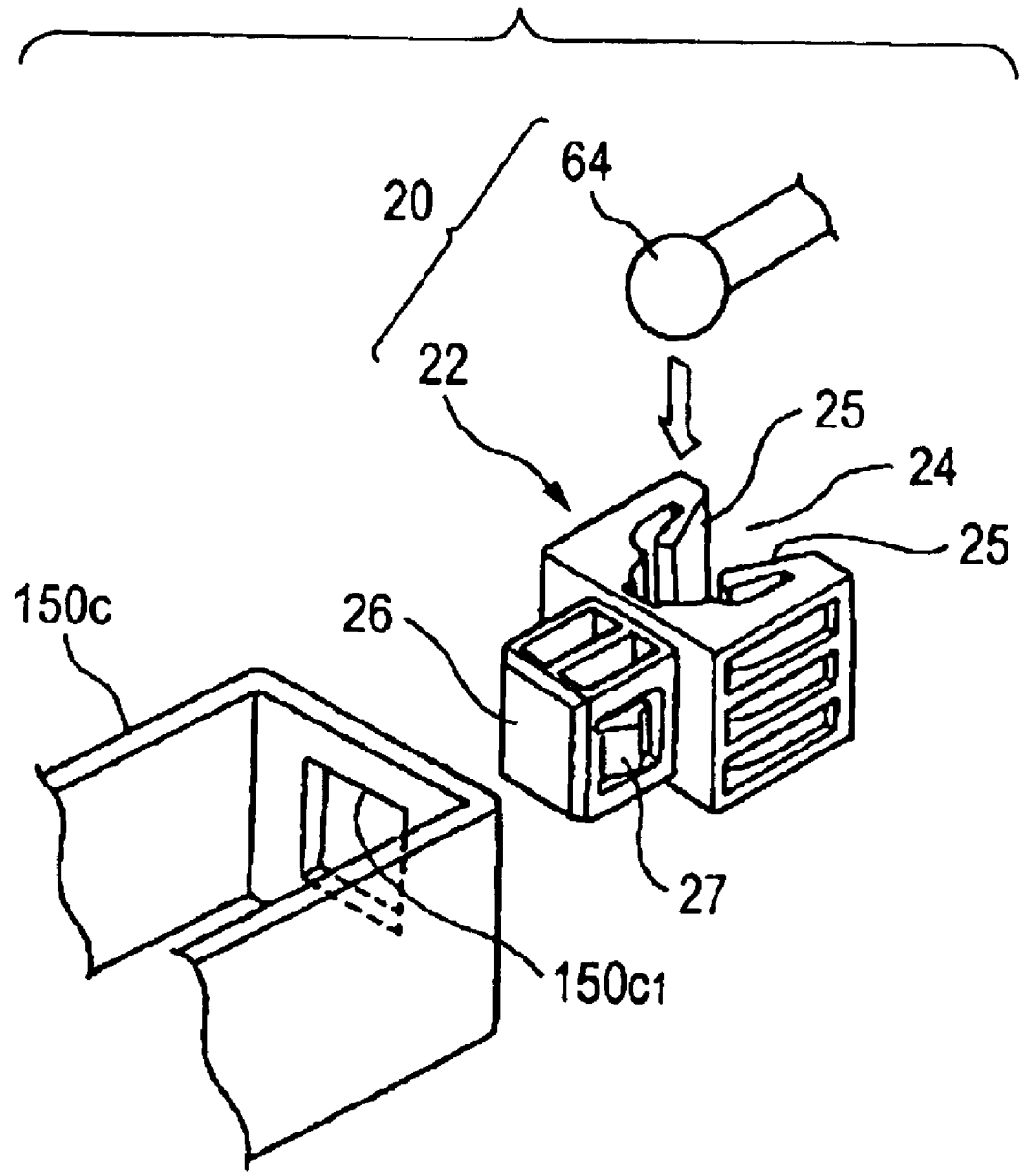
FIG. 9 is an exploded perspective view showing a ball-and-socket joint to be an aiming fulcrum.

Moreover, the actuator 60 for autoleveling has a unit structure in which the moving rod 62 is protruded forward from an actuator unit case 61 having a stepping motor and a gear mechanism provided therein, and the actuator unit case 61 is fixed to an actuator attachment hole 10c formed on the back wall of the lamp body 10. The ball portion 64 is formed on the front end of the moving rod 62 extended forward in the lamp body 10. The bearing 22 formed of a synthetic resin, which is provided with the ball receiving portion 24 for supporting the ball portion 64, is fixed to the bracket 150c protruded toward the backside of the reflector 14. A plug 26 to be matched with a bearing insertion hole 150c1 formed on the bracket 150c and having a rectangular shape is provided on the front end side of the bearing 22 as shown in FIG. 9. Elastic hooks 27 and 27 for preventing the slip-off of the plug 26 engaged with and inserted into the peripheral edge portion of the insertion hole 150c1 are provided on the opposed side wall of the plug 26. On the other hand, a pair of left and right hooks 25 and 25 for holding the ball portion 64 are formed in the ball bearing portion 24 provided on the rear end side of the bearing 22, and the ball portion 64 and the ball receiving portion 24 (the hooks 27 and 27) can relatively slide in a vertical direction in addition to relative rotation. Accordingly, a stress to be generated between the ball portion 64 and (the ball receiving portion 24 of) the bearing 22 by a difference between a rectilinear advance and retreat operation (a moving track) in the longitudinal direction of the ball portion 64 by the driving operation of the actuator 60 and a rotating operation (a moving track) around the leveling axis Lx1 of (the ball receiving portion 24 of) the bearing 22 in cooperation therewith is absorbed (released) by the ball-and-socket joint structure of the ball portion 64 and the ball receiving portion 24 which can carry out relative rotation and relative sliding in a vertical direction.

Next, each member constituting the aiming mechanism E will be described in detail.

The screw insertion holes 10a and 10b are constituted by a cylindrical portion 50 formed integrally with the lamp body 10 and extended in a longitudinal direction as shown in FIGS. 5(a) and (b).

Figure 7:
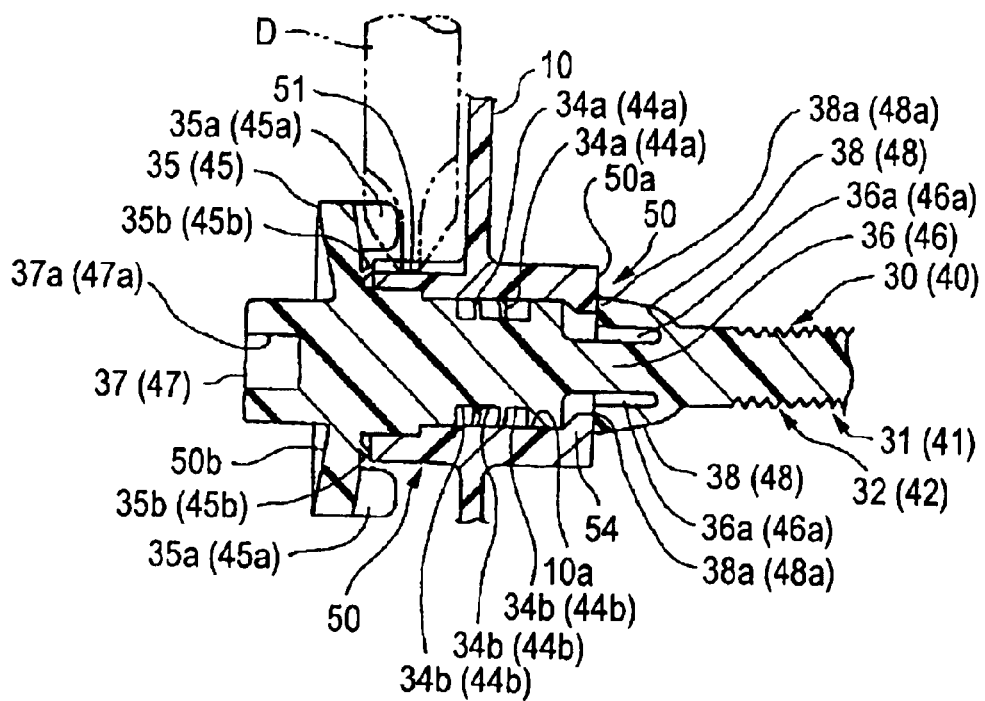
FIG. 7 is an enlarged longitudinal sectional view showing the rotating support portion of the aiming screw.

The cylindrical portion 50 has a sufficient longitudinal length to hold the aiming screw 30 (40) to be supported rotatably and to be steady. Moreover, the amount of the extension of a rear extended portion SOB is set to carry the tip portion of a driver D for an aiming screw rotating operation provided along the lamp body 10 as shown in FIG. 7. Further, the upper side surface of the rear extended portion 50B is provided with a flat surface 51 for positioning to bring a state in which the teeth of the driver D are mated with those of a cap-shaped gear at time of abutment of the tip portion of the driver D. When the driver D is to be rotated, the tip portion of the driver D does not slide along the outer peripheral surface of the cylindrical portion 50, When the cylindrical portion 50 is molded integrally with the lamp body 10, it may have a simple shape. For this reason, the structure of a mold for molding and the molding surface of the mold are also simple and the molding can also be carried out easily.

Figure 6:
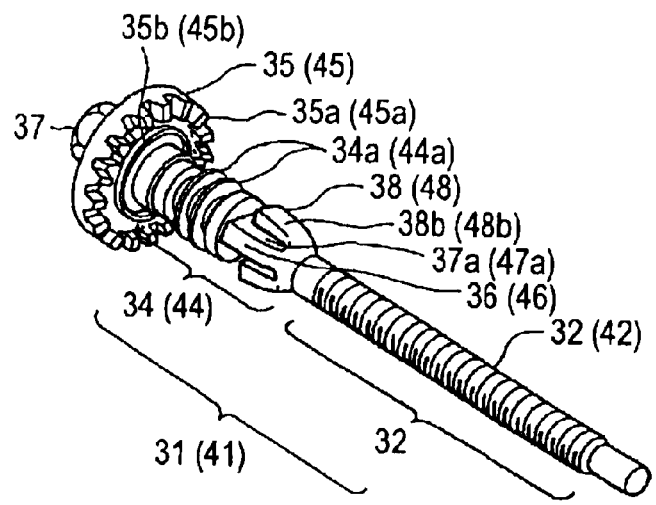
FIG. 6(a) is an enlarged perspective view showing the aiming screw.
FIG. 6(b) is an enlarged side view showing the aiming screw.
FIG. 6(c) is a cross-sectional view showing the aiming screw (a sectional view taken along a line VI—VI illustrated in FIG. 6(b))
Figure 6:
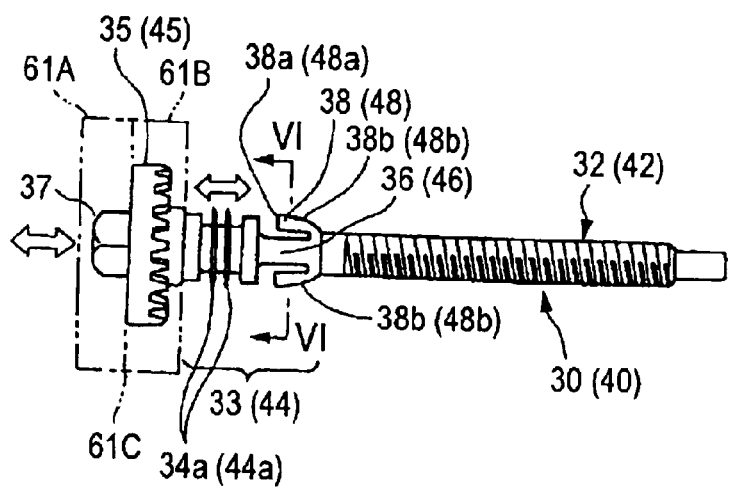
Figure 6:
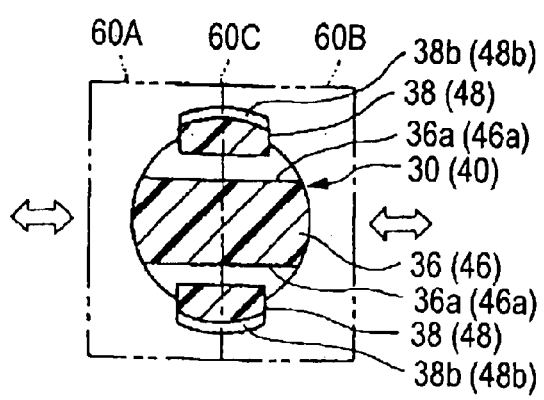

In the aiming screw 30 (40), a screw body 31 (41) on the front end side which is provided with a male screw portion 32 (42), and furthermore, the whole portion including a cap-shaped gear portion 35 (45) on a rear end are constituted by a synthetic resin such as a polyacetal resin as shown in FIGS. 6 and 7.

The reference numeral 34 (44) denotes a portion supported by the cylindrical portion 50, that is, a supported portion in the aiming screw 30 (40) and the cap-shaped gear portion 35 (45) to abut on an end face 50b of the rear extended portion of the cylindrical portion 50 is integrally formed on the rear end side of the supported portion 34 (44), and an elastic engagement piece 38 (48) to be engaged with an end face (a front end face of the cylindrical portion) 50a on an inner flange-shaped front end in the forward extended portion 50A of the cylindrical portion 50 is provided on the front end side of the supported portion 34 (44).

The elastic engagement piece 38 (48) is formed to be L-shaped on both sides of a base portion 36 (46) having a rectangular cross section which is chamfered such that left and right side surfaces 36a (46a) on the front end side of the supported portion 34 (44) are opposed as shown in FIGS. 6 and 7 and a horizontal extended portion extended rearward is elastically deformable in a radial direction. The horizontal extended portion of the elastic engagement piece 38 (48) is formed to have a greater thickness toward the tip side and can have a rigidity and a strength enhanced as a leaf spring, and is disengaged from the end face 50a of the cylindrical portion 50 with difficulty.

A skirt-shaped elastic rib 35b (45b) to come in sliding contact with the rear end face 50b of the cylindrical portion 50 is provided on the base side of the cap-shaped gear 35 (45) on the rear end side of the supported portion in the aiming screw 30 (40). The elastic rib 35b (45b) abuts on the rear end face 50b of the cylindrical portion 50 and the elastic engagement piece 38 (48) on the front end side of the supported portion 34 (44) is engaged with the front end face 50a of the cylindrical portion 50 so that the aiming screw 30 (40) is positioned and fixed in an axial direction with respect to the screw insertion hole 10a (10b). The elastic rib 35b (45b) is held in a pressure contact state with the rear end face 50b of the cylindrical portion 50 to elastically support the aiming screw 30 (40) in an axial direction, thereby holding the aiming screw 30 (40) to be steady in the rotating support portion. Moreover, the elastic rib 35b (45b) also may provide some waterproofing in the rotating support portion of the aiming screw 30 (40).

The tooth 35a (45a) of the cap-shaped gear portion 35 (45) is provided in the front part (the side facing the lamp body 10). When the tip portion of the driver D for the aiming screw rotating operation provided along the lamp body 10 is caused to abut on the flat surface 51 of the cylindrical portion 50 as shown in FIG. 7, the tooth of the driver D is exactly mated with the tooth 35a (45a) of the cap-shaped gear portion 35 (45) so that rotating force on the driver D side is transmitted to the cap-shaped gear portion 35 (45) side.

Moreover, a rotating portion 37 (47) taking an external shape having a regular hexagonal section and provided with a square groove 37a (47a) on an end face is formed integrally with the rear end of the aiming screw 30 (40) (behind the cap-shaped gear portion 35 (45)), and the aiming screw 30 (40) can also be rotated by using a tool such as a spanner in place of the driver D.

Furthermore, the elastic rib 35b (45b) formed of a synthetic resin has a proper elasticity (flexibility) and the rear end face 50b of the cylindrical portion 50 formed of a synthetic resin has a smooth surface. Therefore, the sliding contact portion between the elastic rib 35b (45b) and the cylindrical rear end face 50b does not hinder the rotation of the aiming screw 30 (40).

Moreover, a circular elastic waterproof rib 34a (44a) coming in sliding contact with the inner peripheral surface of the cylindrical portion 50 (the screw insertion holes 10a, (10b)) is formed integrally with the supported portion 34 (44) of the aiming screw. The outside diameter of the waterproof rib 34a (44a) is slightly larger than the inside diameter of the screw insertion hole 10a (10b) so that the tip portion of the waterproof rib 34a (44a) is always caused to come in pressure contact with the inner peripheral surface of the screw insertion hole 10a (10b).

An annular groove 34b (44b) extended along the elastic waterproof rib 34a (44a) is formed on both sides of the waterproof rib 34a (44a) on the outer peripheral surface of the supported portion 34 (44), and the amount of protrusion in the radial direction of the elastic waterproof rib 34a (44a) is increased without enlarging a clearance between the supported portion 34 (44) of the aiming screw and the screw insertion hole 10a (10b) so that the elasticity (flexibility) of the elastic waterproof rib 34a (44a) can be enhanced. Consequently, a proper pressure contact force acts between the elastic waterproof rib 34a (44a) and the inner peripheral surface of the screw insertion hole 10a (10b).

Figure 8:
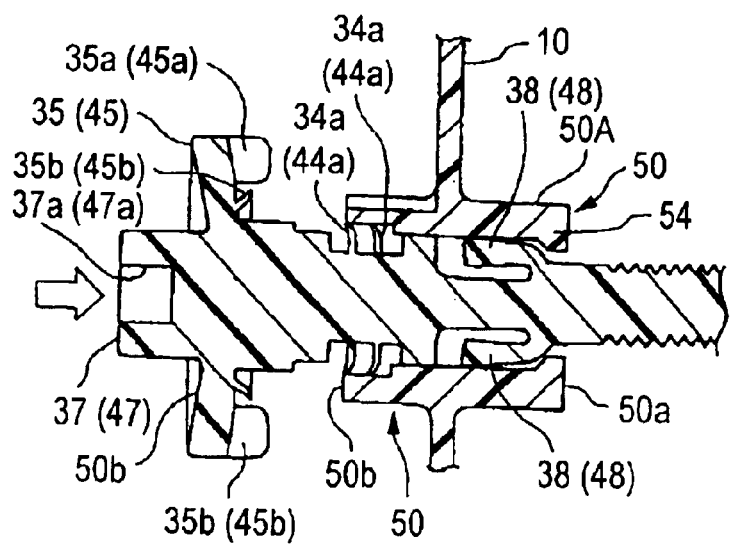
FIG. 8 is a view illustrating a state in which the aiming screw is inserted in a screw insertion hole.

A portion of the aiming screw 30 (40) which is provided ahead of the supported portion 34(44) can be injection molded by using a pair of division molds 60A and 60B divided in the radial direction as shown in an open arrow of FIG. 6(c), and the cap-shaped gear portion 35 (45) of the aiming screw 30 (40) can be injection molded by using a pair of division molds 61A and 61B divided in an axial direction as shown in an open arrow of FIG. 6(b). The reference numerals 61C and 60C in FIGS. 6(b) and (c) denote a parting line of the division mold. In order to assemble the aiming screws 30 and 40 into the cylindrical portion 50 of the lamp body 10 (the screw insertion holes 10a and 10b), moreover, it is preferable that the aiming screws 30 and 40 should be pushed from the rear side of the lamp body 10 into the screw insertion hole 10a (10b). More specifically, as shown in FIG. 8, the elastic engagement piece 38 (48) can be elastically deformed inward in the radial direction to pass through the inside of the cylindrical portion 50, and the elastic engagement piece 38 (48) thus passing is restored outward in the radial direction to be engaged with the front end face 50a of the cylindrical portion so that the aiming screw 30 (40) can be prevented from slipping off rearward. At the same time, the skirt-shaped elastic rib 35b (45b) on the rear end side of the supported portion 34 (44) is brought into a pressure contact state with the rear end face 50b of the cylindrical portion so that the aiming screw 30 (40) is positioned and fixed in the axial direction with respect to the screw insertion hole 10a (10b).

Next, description will be given to the structure of each nut member 130A (130B) to be screwed into the aiming screw 30 (40), the bearing 160A (160B) attached to the bracket 150a (150b) and serving to support the nut member 130A (130B), and the nut sliding guide 230A (230B) for locking the nut member 130A (130B) and carrying and slidably supporting the nut member 130A (130B).

Figure 4:
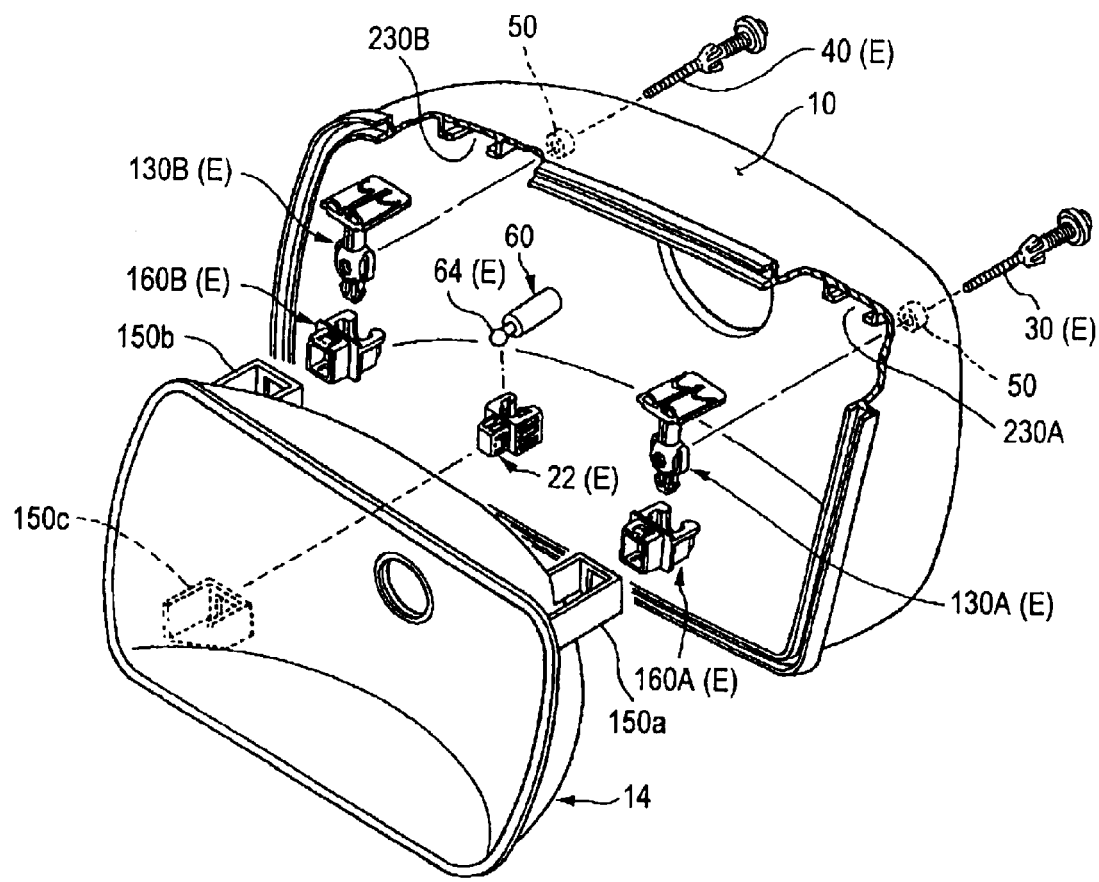
FIG. 4 is an exploded perspective view showing a lamp body, a reflector and an aiming mechanism.
Figure 5:
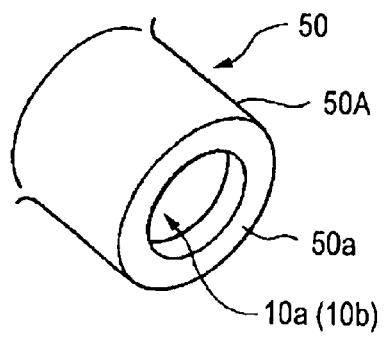
FIG. 5(a) is an enlarged perspective view showing a cylindrical portion constituting the rotating support portion of an aiming screw.
FIG. 5(b) is an enlarged longitudinal sectional view showing the cylindrical portion.
Figure 5:
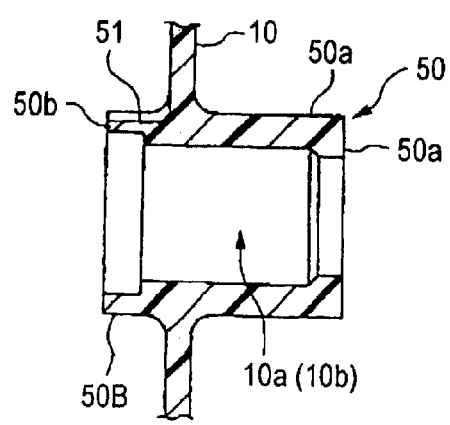

As shown in FIGS. 1, 3, 4, 14 and 15, the nut sliding guide 230A (230B) is extended longitudinally in the vicinal position of a lamp body wall surface provided above the aiming screw 30 (40) and takes the shape of a rectangular frame including a wide dovetail groove 232 (242) having an opened side surface facing the aiming screw 30 (40). The reference numeral 231 denotes the opening of the dovetail groove 232. Moreover, the nut sliding guide 230A (230B) is formed integrally with the wall surface of the lamp body 10 so that the strength of the nut sliding guide can be maintained. The nut sliding guide 230A (230B) is provided on the upper right corner (the upper left corner) as seen from the front of the lamp body 10 as shown in FIGS. 1 and 4.

The nut member 130A (130B) is a molded member formed of engineering plastic which has an excellent rigidity, strength and sliding property, and a slider 137 is integrally formed through an extended shaft portion 136 on the side of an almost spherical nut member body 131 having a center provided with a female screw portion 132 to be screwed into the aiming screw 30 (40). More specifically, the spherical nut member body 131 is protruded from almost the central part of the back face of the slider 137.

Moreover, the bearing 160A (160B) is a molded member formed of engineering plastic having an excellent rigidity, strength and sliding property in the same manner as in the nut member 130A (130B), and is provided with a through hole 161 capable of inserting the aiming screw 30 (40) therein and extended longitudinally, and the front end side of the bearing 160A (160B) is provided with a rectangular plug 168 to be matched with the bearing insertion hole 150a1 (150b1) formed on the bracket 150a (150b). Elastic hooks 169 and 169 engaged with the bearing insertion hole 150a1 (150b1) and held so as not to slip off are provided on the opposed side surfaces of the plug 168. On the other hand, a ball receiving portion 162 for supporting the nut member body 131 to be the ball portion is formed on the rear end side of the bearing 160A (160B). The ball bearing portion 162 is formed to have a longitudinal U-shaped section opened to the side such that the nut member body 131 to be the ball portion can be introduced from the side and can be thus engaged. The inner peripheral surface of the ball receiving portion 162 is provided with a spherical inner peripheral surface 162a to be matched with the spherical outer peripheral surface 131a of the nut member body 131 to be the ball portion.

Figure 10:
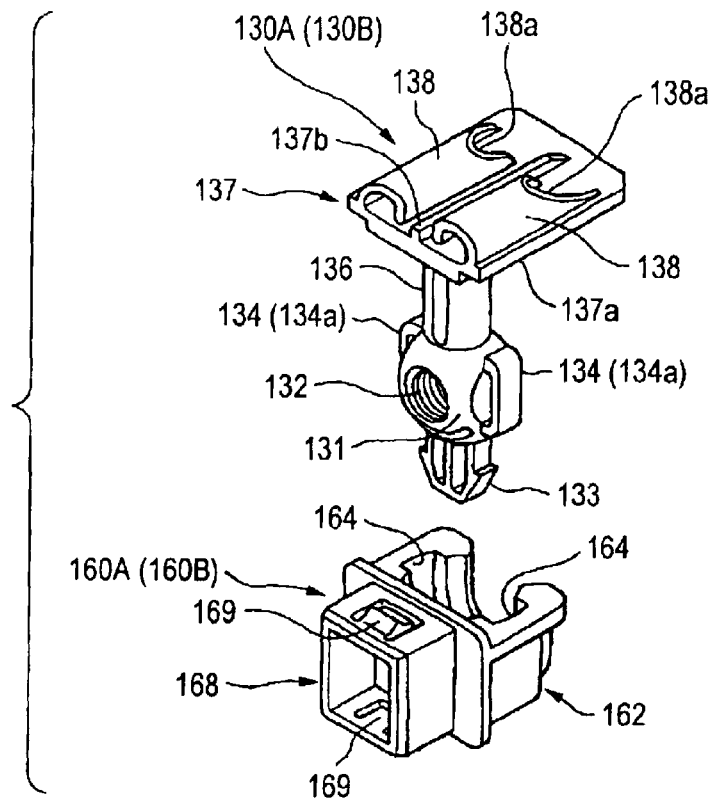
FIG. 10 is an exploded perspective view showing a nut member and a bearing.

Furthermore, an elastic hook 133 to be engaged with the peripheral edge portion of a hole 163 provided on the bottom of the ball receiving portion 162 (a lateral bar-like portion having a U-shaped section) to prevent the nut member 130A (130B) from slipping off from the bearing 160A (160B) is extended on the opposite side to the side on which the slider 137 is formed with the female screw portion 132 of the nut member body 131 interposed therebetween. When the nut member 130A (130B) is pressed from the elastic hook side 133 into the ball receiving portion 162 as shown in FIG. 10, the ball portion to be the nut member body 131 can be engaged with and held in the ball receiving portion 162 of the bearing 160A (160B).

Figure 14:
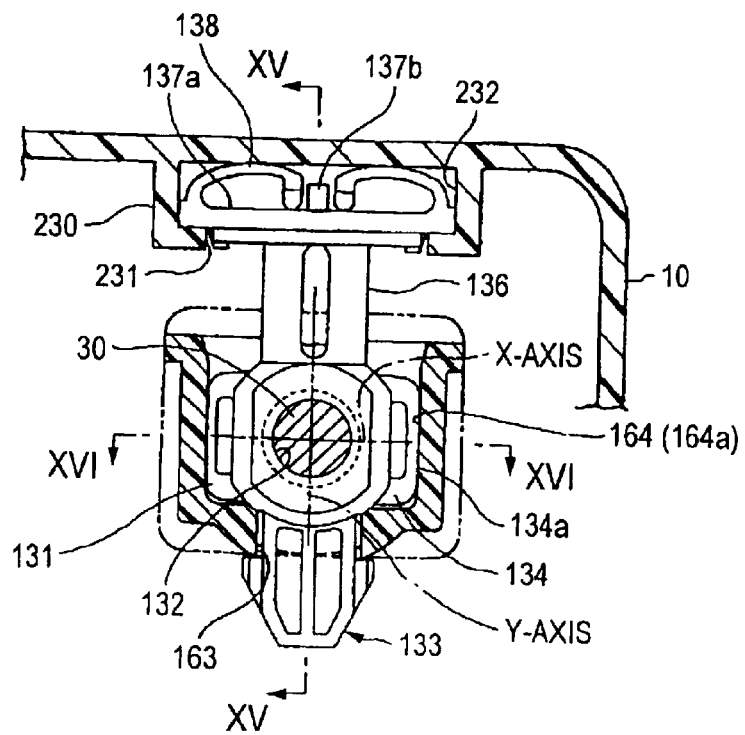
FIG. 14 is a sectional view showing an engagement portion between the nut member and the bearing which constitute an aiming point.
Figure 15:
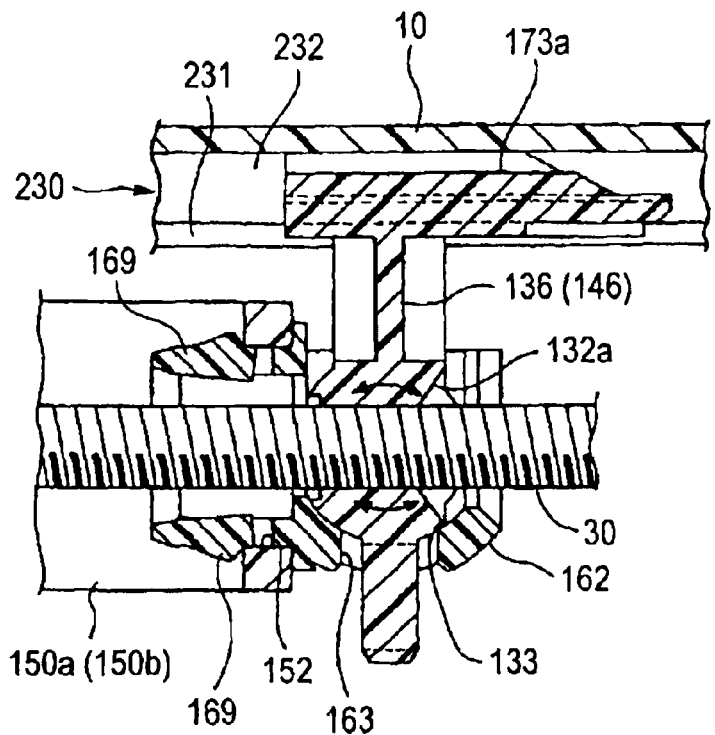
FIG. 15 is a sectional view illustrating the engagement portion between the nut member and the bearing (a sectional view taken along a line XV—XV shown in FIG. 14)
Figure 16:
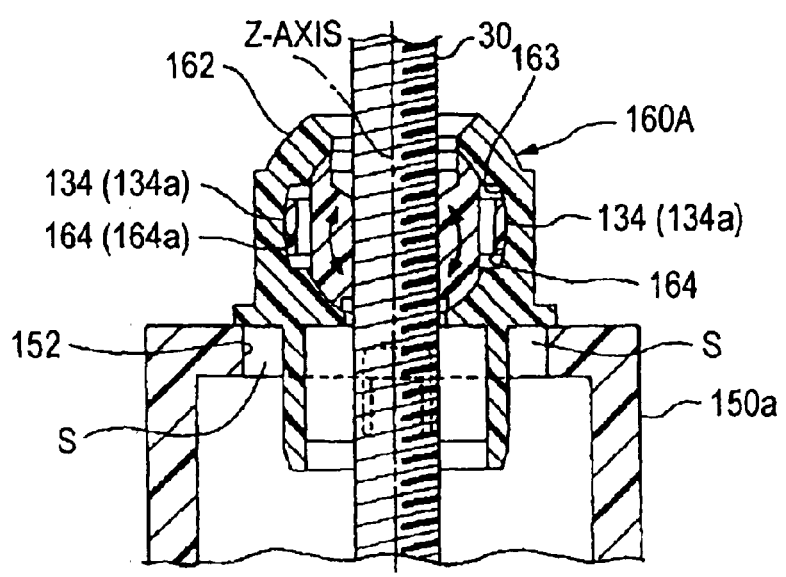
FIG. 16 is a sectional view illustrating the engagement portion between the nut member and the bearing (a sectional view taken along a line XVI—XVI shown in FIG. 14), that is, a view illustrating a stress releasing function in an attachment portion between the nut member and the bracket.
Figure 17:
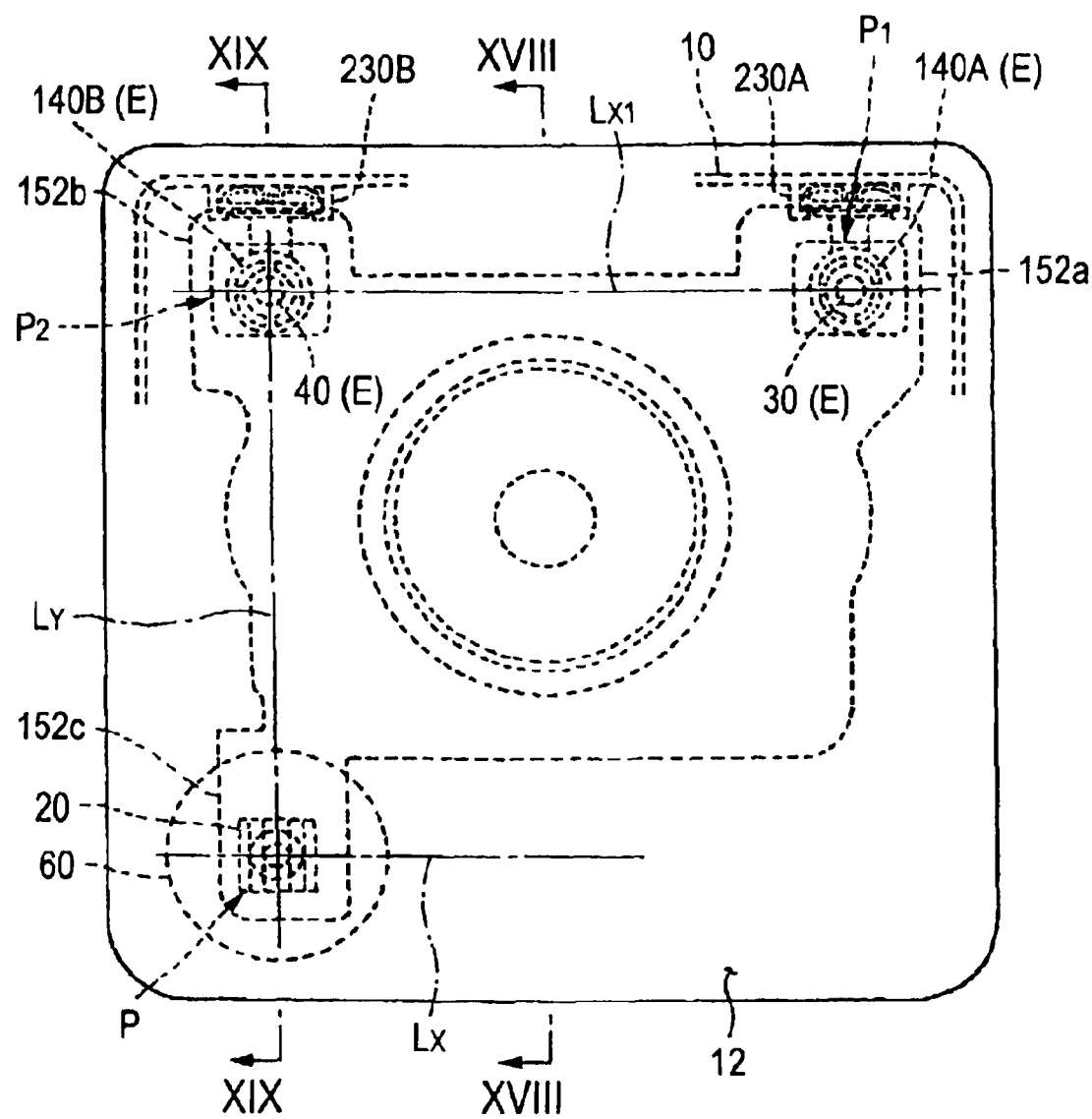
FIG. 17 is a front view showing a headlamp for a vehicle according to a second embodiment of the invention.
Figure 18:
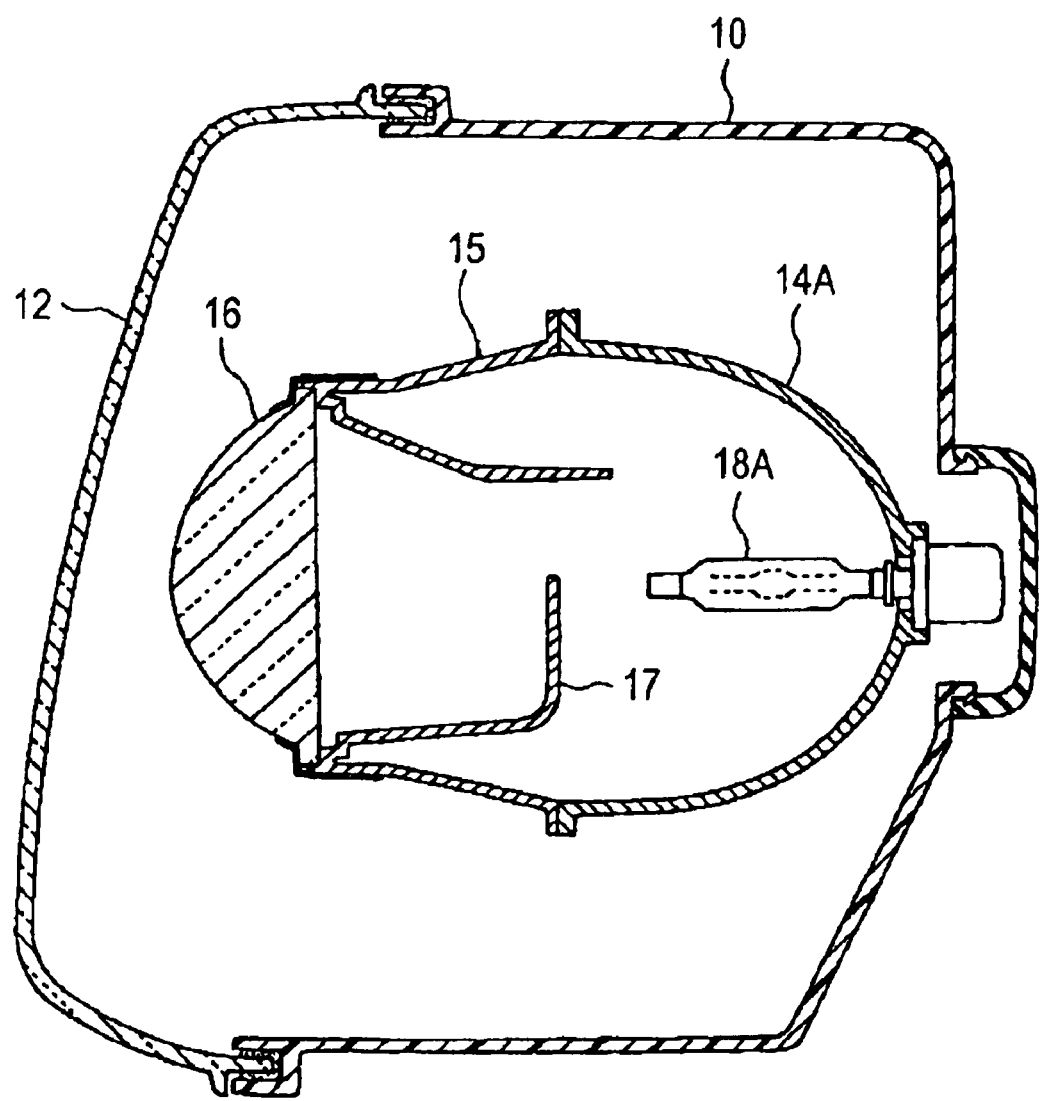
FIG. 18 is a longitudinal sectional view illustrating the headlamp (a sectional view taken along a line XVIII—XVIII shown in FIG. 17)
Figure 19:
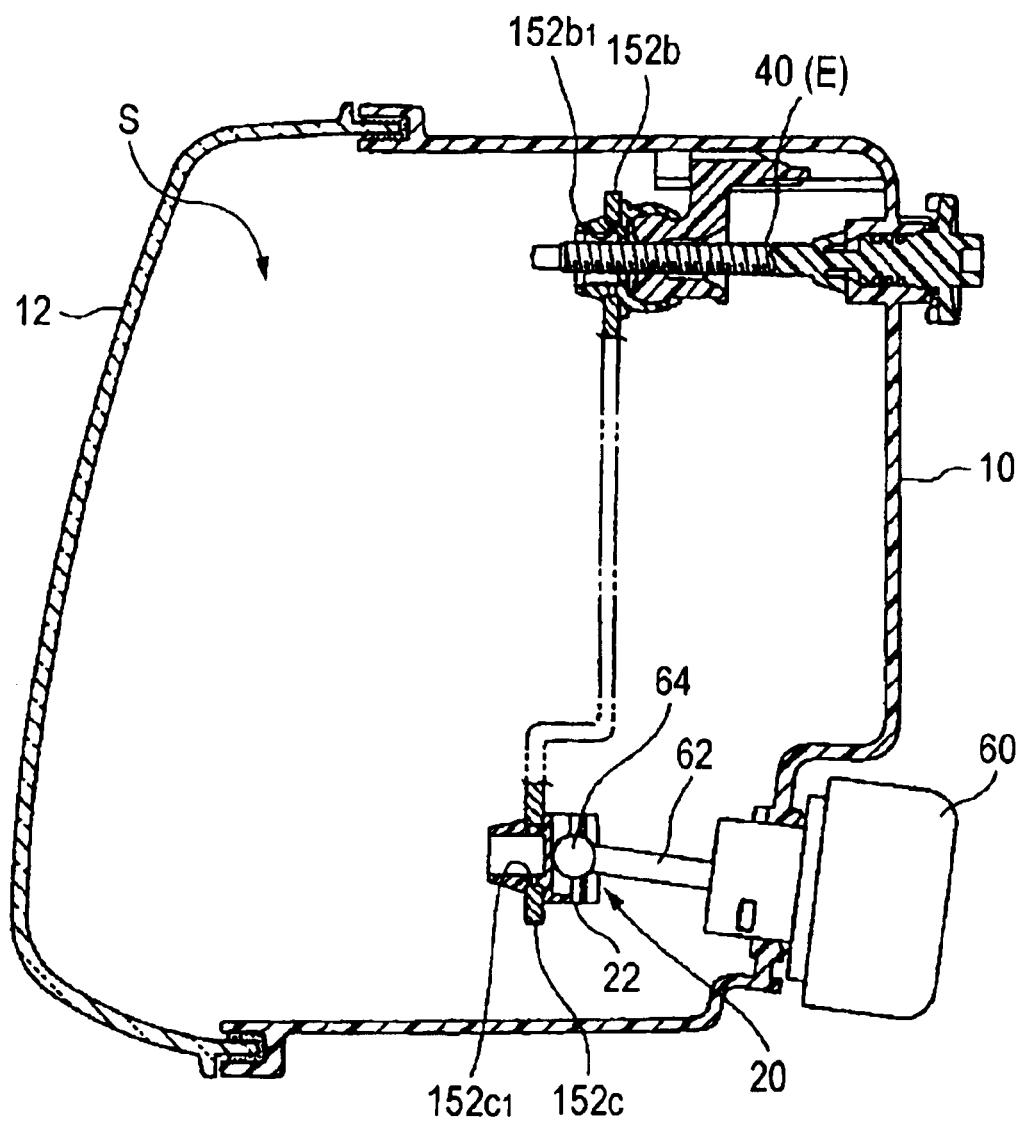
FIG. 19 is a longitudinal sectional view illustrating the headlamp (a sectional view taken along a line XIX—XIX shown in FIG. 17)
Figure 20:
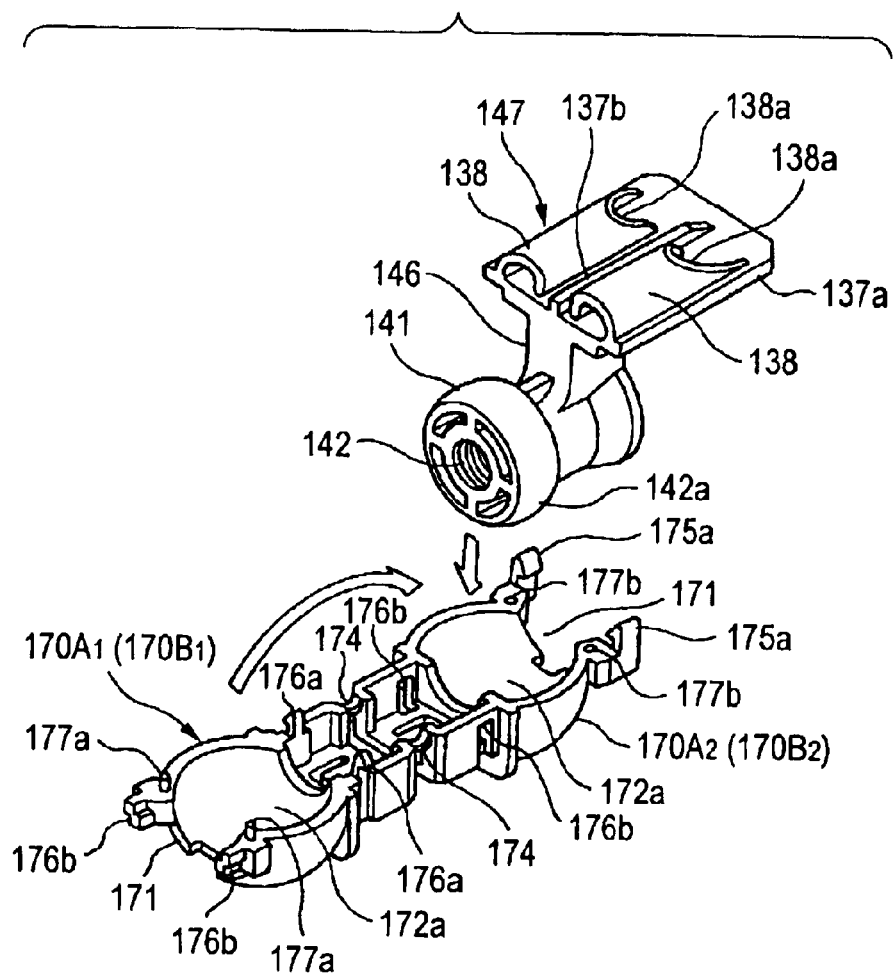
FIG. 20 is an exploded perspective view showing a nut member and a bearing which constitute an aiming point.
Figure 21:
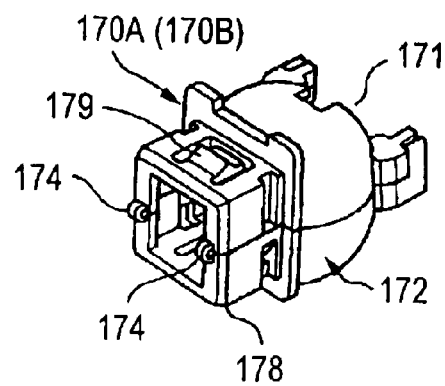
FIG. 21 is a perspective view showing the bearing.

The hole 163 is rectangular and the elastic hook 133 is engaged with the peripheral edge portion of the hole 163 to be prevented from slipping off in the direction of an elastic hook extending longitudinal axis (Y axis) as shown in FIG. 14, and a predetermined clearance is provided in a longitudinal direction (a transverse direction in FIG. 15, a vertical direction in FIG. 16) between the hook 133 inserted into the hole 163 and the peripheral edge portion of the hole 163 as shown in FIG. 15. More specifically, the elastic hook 133 is movably fitted in the hole 163 around the elastic hook extending longitudinal axis (Y axis) and can thus carry out relative rotation (see the arrow indicating rotation in FIG. 16).

Figure 13:
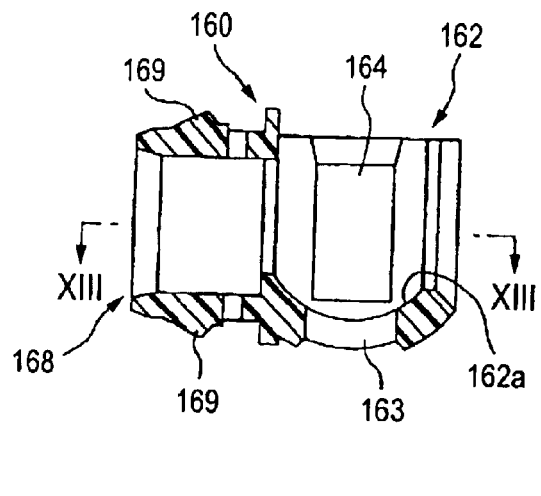
FIG. 13(a) is a longitudinal sectional view showing the bearing.
FIG. 13(b) is a horizontal sectional view illustrating the bearing (a sectional view taken along a line XIII—XIII shown in FIG. 13(a))
Figure 13:
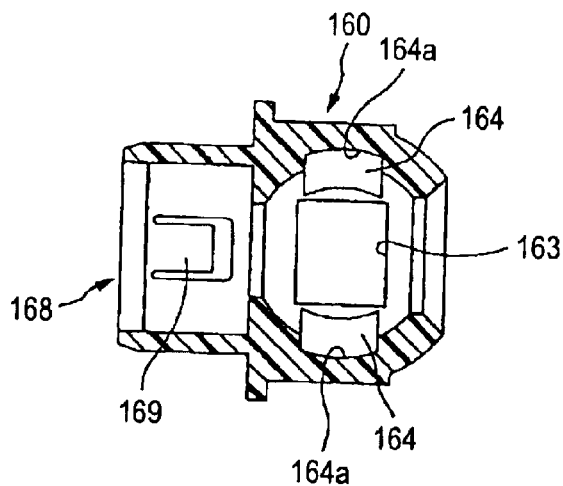

Moreover, a gate rib 134 is protruded across the female screw portion 132 in an opposed position in the outer side surface of the nut member body 131 which is orthogonal to the direction of the elastic hook extending longitudinal axis (Y axis) and interposes the female screw portion 132 therebetween as shown in FIG. 12(a). On the other hand, a groove 164 extended in the pressing direction of the nut member with which the gate rib 134 can be engaged is formed on the inside of the ball receiving portion 162 as shown in FIG. 13. When the elastic hook 133 is engaged with the peripheral edge portion of the hole 163, an outer surface 134a of the horizontal beam portion of the gate rib 134 is brought into a pressure contact configuration with the bottom face 164a of the groove (see FIGS. 14 and 16) so that the relative rotation of the ball receiving portion 162 and the nut member body 131 to be the ball portion around the female screw portion center axis (Z axis) is blocked. Consequently, the nut member 130A (130B) does not shake transversely with respect to the bearing 160A (160B) so that the reflector 14 is supported steadily in a transverse direction by the slider 137 and the sliding guide 230A (230B).

Moreover, the outer surface 134a of the horizontal beam portion of the gate rib 134 and the bottom face 164a of the groove on the inside of the ball receiving portion with which the outer surface 134a of the horizontal beam portion comes in sliding contact are formed to have a circular arc-shaped cross section so that the relative rotation of the nut member body 131 to be the ball portion and the ball receiving portion 164 around the elastic hook extending longitudinal axis (Y axis) can be carried out smoothly.

The slider 137 is constituted by a rectangular slide plate 137a and a pair of left and right leaf spring-shaped elastic extended pieces 138 formed on the bottom face side thereof. The elastic extended piece 138 is curved to have a circular arc-shaped section and is extended from the outside in the lateral direction of the slide plate 137a toward the inside, and furthermore, a longitudinal rib 137b is extended longitudinally in a central part in the lateral direction of the slide plate 137a When the slider 137 is assembled into the nut sliding guide 230A (230B), the tip portions of the pair of left and right elastic extended pieces 138 deformed elastically abut on the longitudinal rib 137b as shown in a virtual line of FIG. 12(a) More specifically, in such a configuration that the slider portion 137 is engaged with the dovetail groove 232 of the nut sliding guide 230A (230B), the tip portion of the elastic extended piece 138 to come in pressure contact with the inner wall surface 234 abuts on both sides of the longitudinal rib 137b and the elastic extended piece 138 forms an arch so that the slider portion 137 is supported steadily in vertical and transverse directions in the nut sliding guide 230A (230B) and can be held slidably in a longitudinal direction to be the direction of extension of the nut sliding guide 230A (230B)

Moreover, the side edge of the elastic extended piece 138 on the back side of the slider 137 has an oblique cut shape as shown in the reference numeral 138a, and can easily be inserted into the nut sliding guide 230A (230B) of the slider 137.

The sliding guide 230A (230B) suspends and supports the weight of the reflector 14 through the nut member 130A (130B), and furthermore, positions the reflector 14 in transverse and vertical directions, thereby suppressing rocking motions in the transverse and vertical directions of the aiming screw 30 (40) (a vibration in the vertical and transverse directions of the reflector 14). Accordingly, the reflector 14 is supported steadily in the vertical and transverse directions and is smoothly tilted around the leveling axis Lx1 in cooperation with the advance and retreat operations of the aiming fulcrum P.

As described in JP-A-2000-165437, for example, in an attachment structure between a bracket and a nut member in which an engagement projection to be a ball portion is provided on the side of a nut member body and is engaged with an engagement hole to be a ball receiving portion provided in the bracket, there is a possibility that a weight load on the reflector side might act as a torsional moment on the nut member, resulting in the vibration of the reflector. In the embodiment, the nut member body 131 itself constitutes the ball portion of a ball-and-socket joint and is supported on the ball receiving portion 162 of the bearing 160A (160B) attached to the bracket. For this reason, such a drawback is eliminated. More specifically, an inertial weight load on the reflector 14 side acts on the position of the axial center of the aiming screw 30 (40) to be screwed into the female screw portion 132 of the nut member body 131. Therefore, the weight load on the reflector 14 side does not act as a torsional moment on the nut member. Correspondingly, the reflector 14 is not vibrated in the vertical and transverse directions.

Moreover, a tapered opening 132a (see FIGS. 12(b) and (c)) to be constricted into the female screw portion 132 is formed on the back side of the nut member body 131 such that the aiming screw 30 (40) can easily be screwed into the female screw portion 132.

Furthermore, the bearing insertion hole 150a1 (150b1) provided in the extended tip portion of the bracket 150a (150b) is formed rectangularly to be matched with the rectangular plug 168 of the bearing 160A (160B). The bearing 160B is inserted and fixed into the bearing insertion hole 150b1 on the bracket 150b side and is thus immovable, while the bearing 160A inserted into the bracket 150a can slide in a transverse direction with respect to the bearing insertion hole 150a1.

Figure 11:
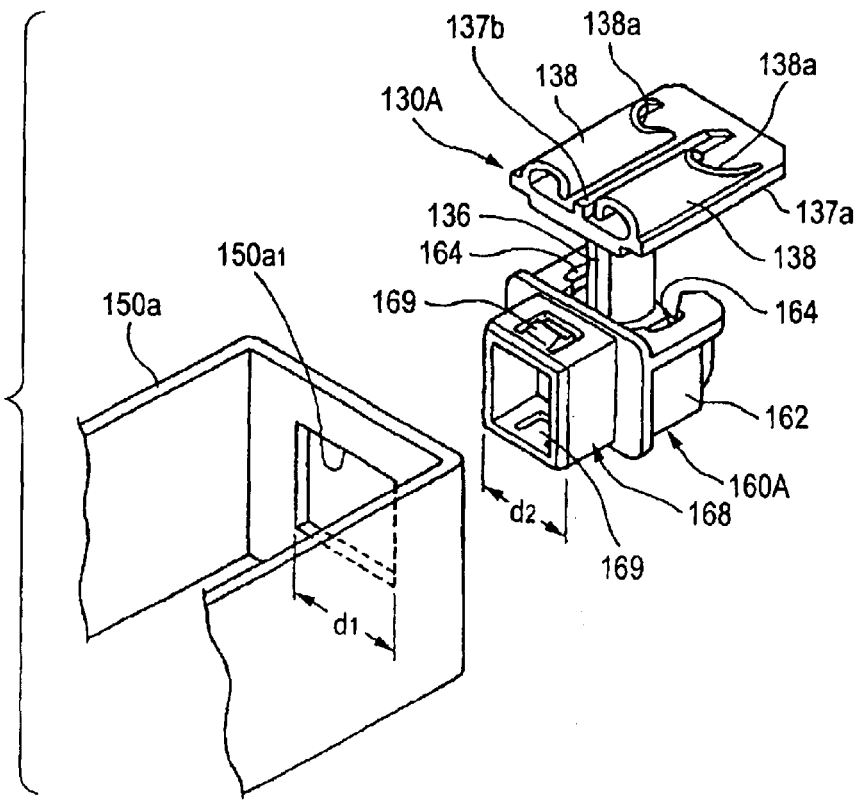
FIG. 11 is an exploded perspective view showing an attachment portion between the bearing and a bracket.
Figure 12:
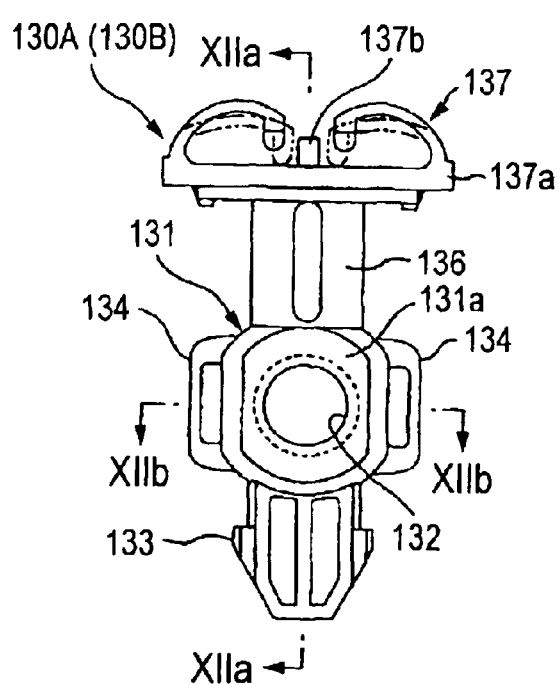
FIG. 12(a) is a front view showing the nut member.
FIG. 12(b) is a longitudinal sectional view illustrating the nut member (a sectional view taken along a line XIIb—XIIb shown in FIG. 12(a))
FIG. 12(c) is a horizontal sectional view illustrating the nut member (a sectional view taken along a line XIIc—XIIc shown in FIG. 12(a))
Figure 12:
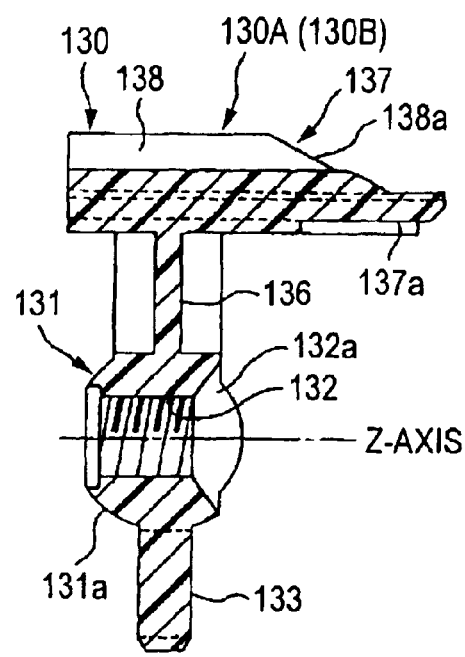
Figure 12:
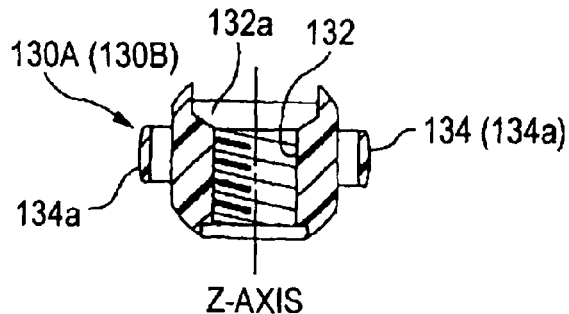

More specifically, as shown in FIG. 11, a lateral width d1 of the bearing insertion hole 150a1 is slightly larger than a lateral width d2 of the rectangular plug 168 of the bearing 160A and a clearance s1 is formed between the bearing insertion hole 150a1 and the plug 168. For this reason, in the case in which the aiming screw 30 is rotated, a tensile stress or a compressive stress is apt to be generated along the leveling axis Lx1 in an attachment portion between the bracket 150a and the bearing 160A because the moving tracks of a circular motion around the vertical tilt axis Ly of the reflector 14 (a circular motion around the vertical tilt axis Ly of the bearing 160A) and the advance and retreat operation of the nut member 130A (a straight-line motion along the aiming screw 30) are different from each other. However, when the bearing 160A (the plug 168) and the bearing insertion hole 150a1 relatively slide in the transverse direction of FIG. 16 to be a load acting direction, an unexpected stress is not generated in the attachment portion between the bracket 150a and the bearing 160A at time of transverse aiming.

Moreover, the ball receiving portion 162 and the nut member body 131 to be the ball portion can be rotated relatively around the elastic hook extending longitudinal axis (Y axis) (see the arrow indicating rotation in FIG. 16) and around an axis (X axis) orthogonal to the elastic hook extending longitudinal axis (Y axis) and the female screw portion center axis (Z axis) respectively. Therefore, an unexpected stress is not generated between the ball receiving portion 162 and the nut member body 131 to be the ball portion by the tilt of the reflector 14 (the tilts around the leveling axis Lx1, the virtual horizontal tilt axis Lx and the vertical tilt axis Ly).

Also, in the case in which the reflector 14 is thermally expanded due to the heat generation of a light source, a stress is apt to be generated with the thermal deformation of the reflector 14 in the engagement portion of the nut member 130A (130B) and the bearing 160A (160B). However, release is carried out by the ball-and-socket joint structure obtained by the nut member body 131 to be the ball portion and the ball receiving portion 162.

Next, description will be given to the procedure for assembling the reflector 14 into the lamp body 10 through the aiming mechanism. First of all, the lamp body 10 having the aiming screws 30 and 40 assembled thereto is turned upward. Next, the ball portions of the nut members 130A and 130B (the nut member body 131) are engaged with the ball receiving portions 162 of the bearings 160A and 160B respectively, and the bearing 22 is fixed to the bracket 150c and the bearings 160A and 160B having the nut members 130A and 130B provided integrally therewith are attached to the insertion holes 150a1 and 150b1 of the brackets 150a and 150b respectively. Then, the brackets 150a, 150b and 150c are turned downward to bring the reflector 14 downward from above the lamp body 10 so that the female screw portions 132 of the nut members 130A and 130B are positioned on the tips of the aiming screws 30 and 40. Subsequently, the aiming screws 30 and 40 are rotated so that the female screw portions 132 of the nut members 130A and 130B are screwed into the aiming screws 30 and 40 respectively and the slider 137 is inserted into the nut sliding guides 230A and 230B. Finally, the ball portion 64 of the actuator 60 for leveling is pressed into (the ball receiving portion 24 of) the bearing 22 attached to the bracket 150c to penetrate through the actuator attachment hole 10c of the lamp body 10 and the actuator 60 is thus fixed to (the attachment hole 10c of) the lamp body 10. Thus, the reflector 14 can be integrated with the lamp body 10 through the aiming mechanism E including an autoleveling mechanism.

FIGS. 17 to 26 show a headlamp according to a second embodiment of the invention.

While the halogen bulb 18 is inserted and integrated with the reflector 14 taking the shape of a paraboloid and formed of a synthetic resin so that the reflection type light source unit U is constituted in the first embodiment described above, a projecting lens 16 is integrated with a reflector 14 taking the shape of an ellipsoid and formed of aluminum into which a discharge bulb 18A is inserted and attached through a cylindrical lens holder 15 formed of aluminum, thereby constituting a projection type light source unit U1 in the second embodiment. The reference numeral 17 denotes a shade for forming a clear cut line which is provided in the vicinity of the second focal point of the reflector 14A taking the shape of the ellipsoid.

Flange-shaped brackets 152a, 152b and 152c provided with bearing insertion holes 152a1, 152b1 and 152c1 are formed integrally with the peripheral edge portion of the front opening of the reflector 14A, and these brackets are extended in the transverse direction of the light source unit U1 therebelow. In the same manner as in the first embodiment, bearings 170A, 170B and 22 are inserted and attached into the bearing insertion holes 152a1, 152b1 and 152c1, and ball portions 141 and 141 of nut members 140A and 140B to be screwed into aiming screws 30 and 40 extended through a lamp body 10 and a ball portion 64 on the tip of the moving rod of an actuator 60 for autoleveling are supported by the bearings 170A, 170B and 22 tiltably by an aiming mechanism E1 in which the light source unit U1 also serves as an autoleveling mechanism.

By the driving operation of the actuator 60 for autoleveling, the light source unit U1 is tilted around a leveling axis Lx1 connecting a vertical aiming point P2 and a vertical and transverse aiming point P1 and the tilt of an optical axis L of a lamp is automatically regulated in a vertical direction corresponding to the running state of a vehicle. By the rotating operation of the aiming screw 30, moreover, the light source unit U1 is tilted around a vertical tilt axis Ly connecting an aiming fulcrum P (a ball-and-socket joint 20) and (the vertical aiming point P2 to be an engagement portion between the bearing 170B and) the nut member 140B and the tilt of the optical axis L can be thus regulated in a transverse direction. By the rotating operation in the same direction of the aiming screws 30 and 40, furthermore, the light source unit U1 is tilted around a virtual horizontal tilt axis (a parallel axis with a horizontal tilt axis Lx1 connecting the vertical aiming point P2 and the vertical and transverse aiming point P1) Lx passing through the aiming fulcrum P (the ball-and-socket joint 20) and the tilt of the optical axis can be thus regulated in the vertical direction.

The basic structure is identical to that of the first embodiment and the shapes of the nut member 140A (140B) and the bearing 170A (170B) are different from those of the first embodiment.

More specifically, in the nut member 140A (140B), the outer peripheral surface of the nut member body 141 provided with a female screw portion 142 in a central part is spherically formed to constitute a ball portion and a slider 147 to be offset from the nut member body 141 to be the ball portion is provided through an L-shaped extended portion 146 extended rearward from the nut member body 141. The slider 147 has the same structure as that of the slider 137 in the nut member 130A (130B) according to the first embodiment, and the same reference numerals are attached and repetitive description thereof will be omitted.

The bearing 170A (170B) is constituted by a hollow molding container member penetrating longitudinally, and a ball receiving portion 172 provided with a spherical inner peripheral surface 172a to be matched with a spherical outer peripheral surface 141a of the ball portion 141 is provided on the rear end side thereof. Moreover, the bearing 170A (170B) is constituted by a pair of division molded members 170A1 and 170A2 (170B1 and 170B2) which are obtained by a longitudinal division along a longitudinal through hole 171 of the hollow container member and can be integrated as the bearing by matching the divided surfaces with each other. The rear end sides of the respective division molded members are greatly cut away as shown in the reference numeral 172b of FIG. 24(a), and the rear end of the bearing 170A (170B) is provided with an opening 171A (171B) in which the L-shaped extended portion 146 extended rearward from the nut member body 141 can be movably fitted. Moreover, the front end sides of the division molded members 170A1 and 170A2 (170B1 and 170B2) are coupled to each other through a pair of thin hinges 174, and hooks 175a and 176a, hook engagement portions 175b and 176b, and a pin 177a and a pin engagement hole 177b are opposed to each other on the corresponding matched surfaces of the division molded members 170A1 and 170A2 (170B1 and 170B2), respectively. When the division molded members 170A1 and 170A2 (170B1 and 170B2) are rotated around the hinge 174 to interpose the ball portion 141 to be the nut member body therebetween so that the hook and the hook engagement portion are concavo-convex lance engaged with each other, they are integrated as the bearing 170A (170B) so that the ball portion 141 is held to be supported on the ball receiving portion 172.

Moreover, the front end side of the bearing 170A (170B) is provided with a plug 178 having the same structure as that of a plug 168 of the bearing 160A (160B) in the first embodiment, and a hook 179 of the plug 178 is engaged with the bearing insertion holes 152a1 and 152b1 of the bracket 152 to prevent slip-off.

Figure 22:
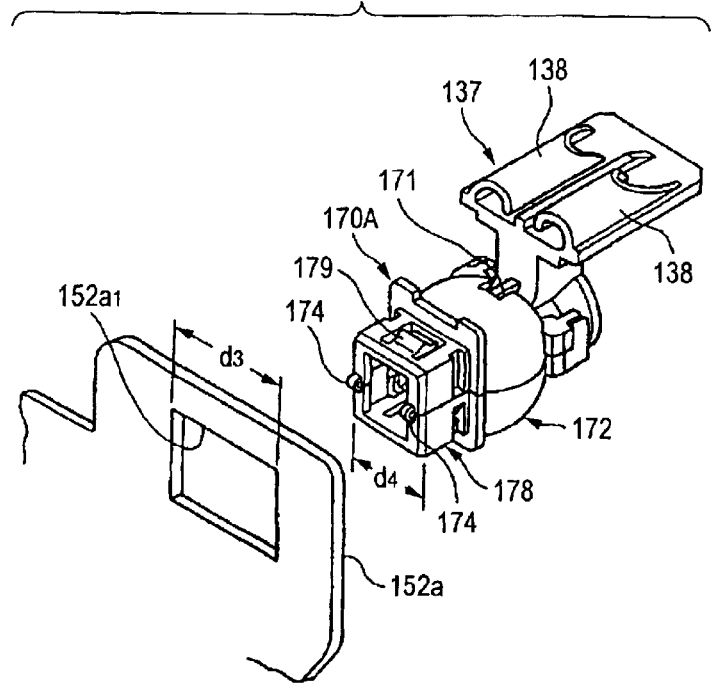
FIG. 22 is an exploded perspective view showing an attachment portion between the bearing and a bracket.
Figure 23:
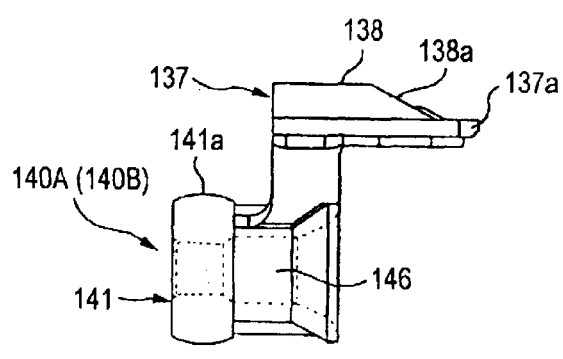
FIG. 23(a) is a side view showing the nut member.
FIG. 23(b) is a sectional view showing the nut member.
Figure 23:
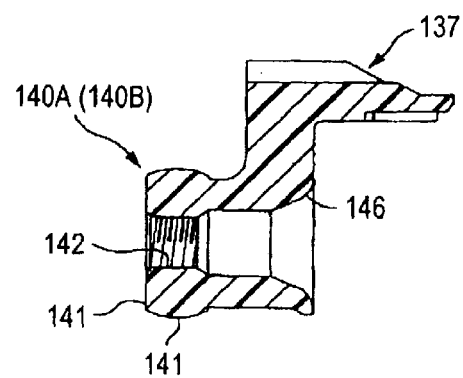
Figure 24:
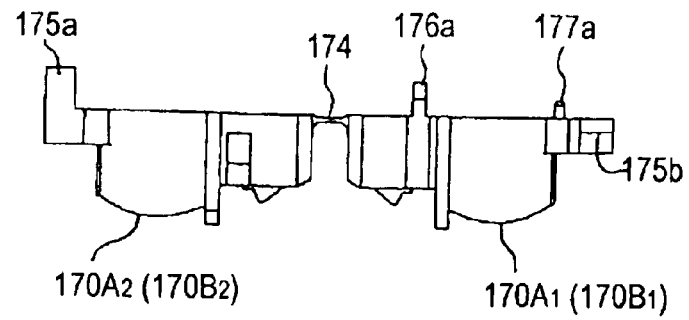
FIG. 24(a) is a side view showing the developed bearing.
FIG. 24(b) is a plan view showing the bearing.
FIG. 24(c) is a longitudinal sectional view showing the bearing.
Figure 24:
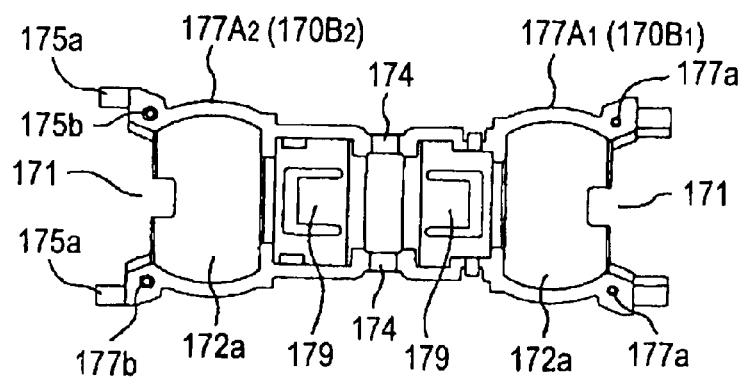
Figure 24:
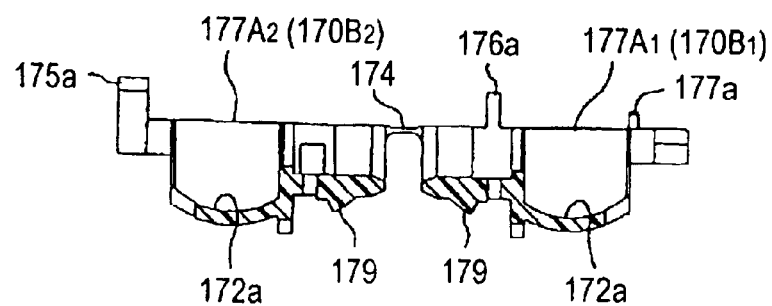
Figure 25:
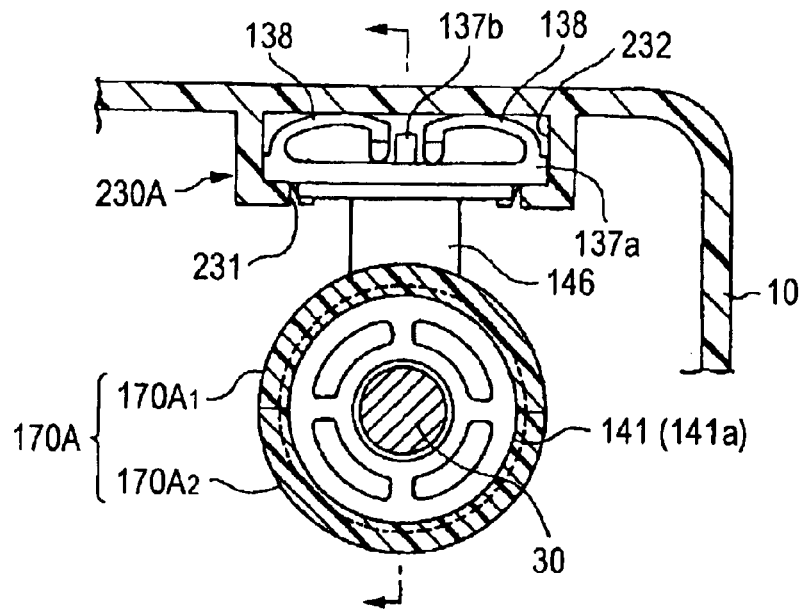
FIG. 25 is a sectional view showing an engagement portion between the nut member and the bearing which constitute the aiming point.
Figure 26:
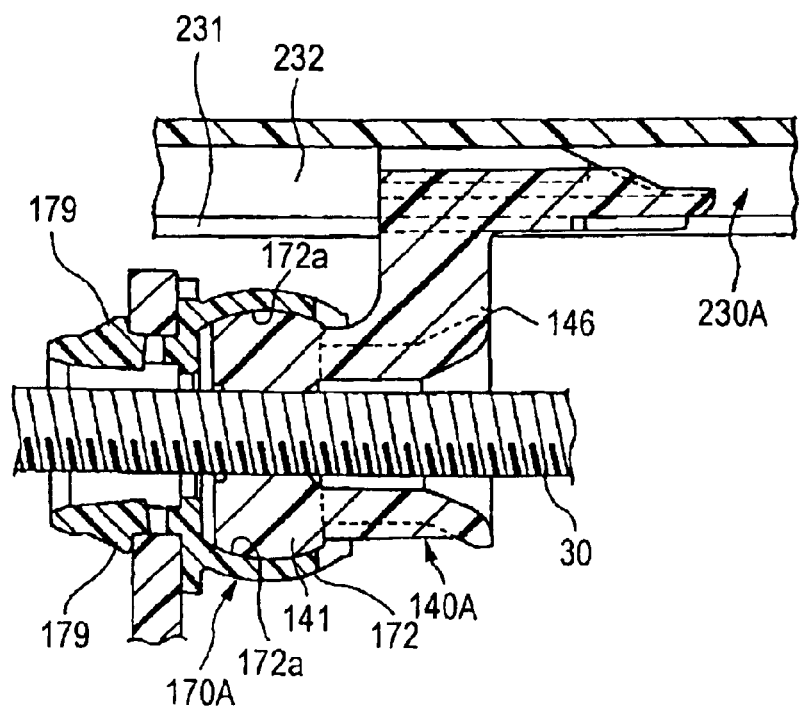
FIG. 26 is a longitudinal sectional view illustrating the engagement portion between the nut member and the bearing (a sectional view taken along a line XXVI—XXVI shown in FIG. 25)

Furthermore, a width d3 of the bearing insertion hole 152a1 on an aiming point P1 is greater than a width d4 of the plug 178 of the bearing 170A (170B) as shown in FIG. 22 in the same manner as the case of the bracket insertion hole 150a1 on the aiming point P1 according to the first embodiment and the bearing 170A slides in a transverse direction along the peripheral edge of the bearing insertion hole 152a1 against a load acting in the transverse direction of FIG. 22, thereby absorbing (releasing) a stress.

Since others are the same as those in the first embodiment, the same reference numerals are attached and repetitive description thereof will be omitted.

Figure 27:
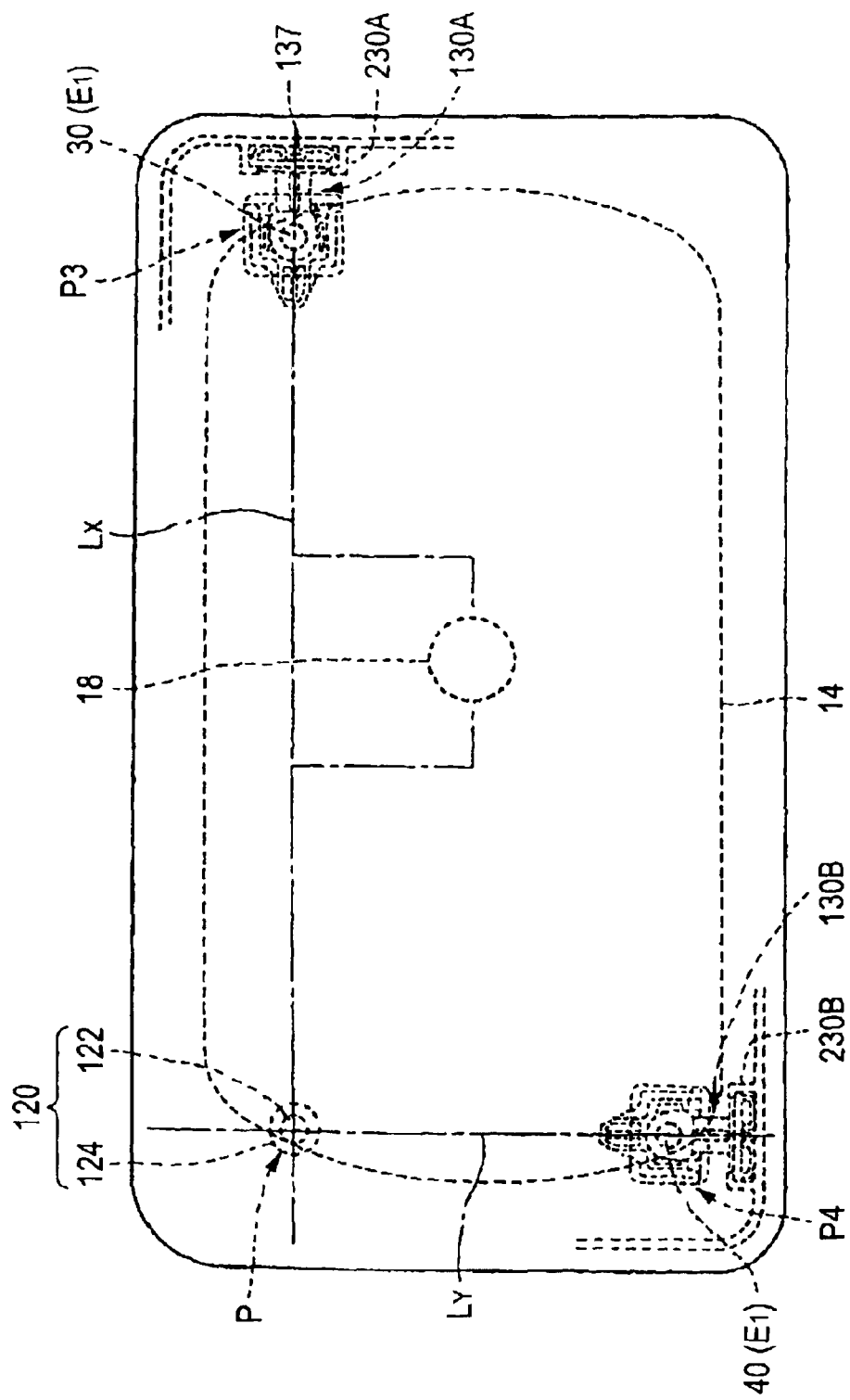
FIG. 27 is a front view showing a headlamp for a vehicle according to a third embodiment of the invention.
Figure 28:
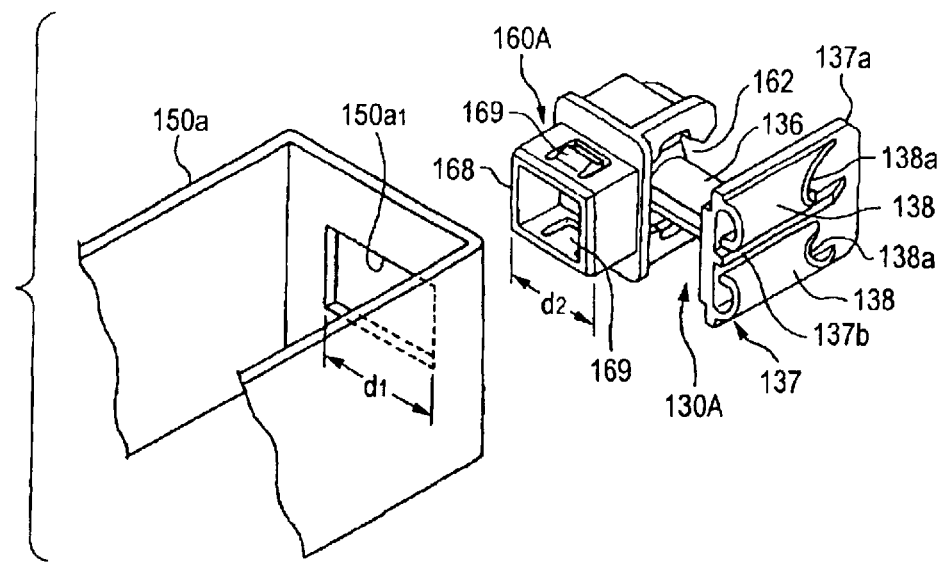
FIG. 28 is an exploded perspective view showing an attachment portion between a bearing and a bracket which constitute a transverse aiming point.
Figure 29:
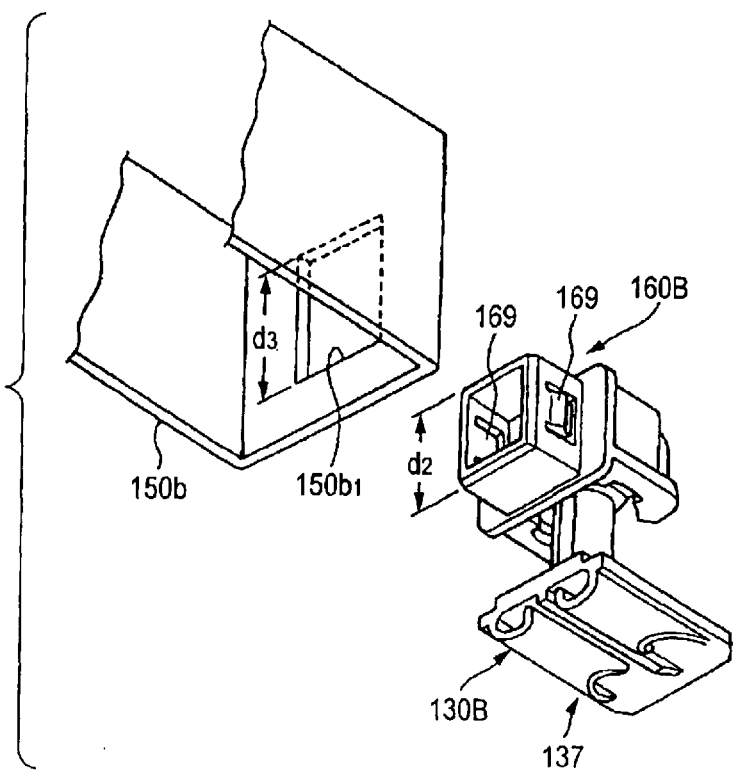
FIG. 29 is an exploded perspective view showing the attachment portion between the bearing and the bracket which constitute a vertical aiming point.
Figure 30:
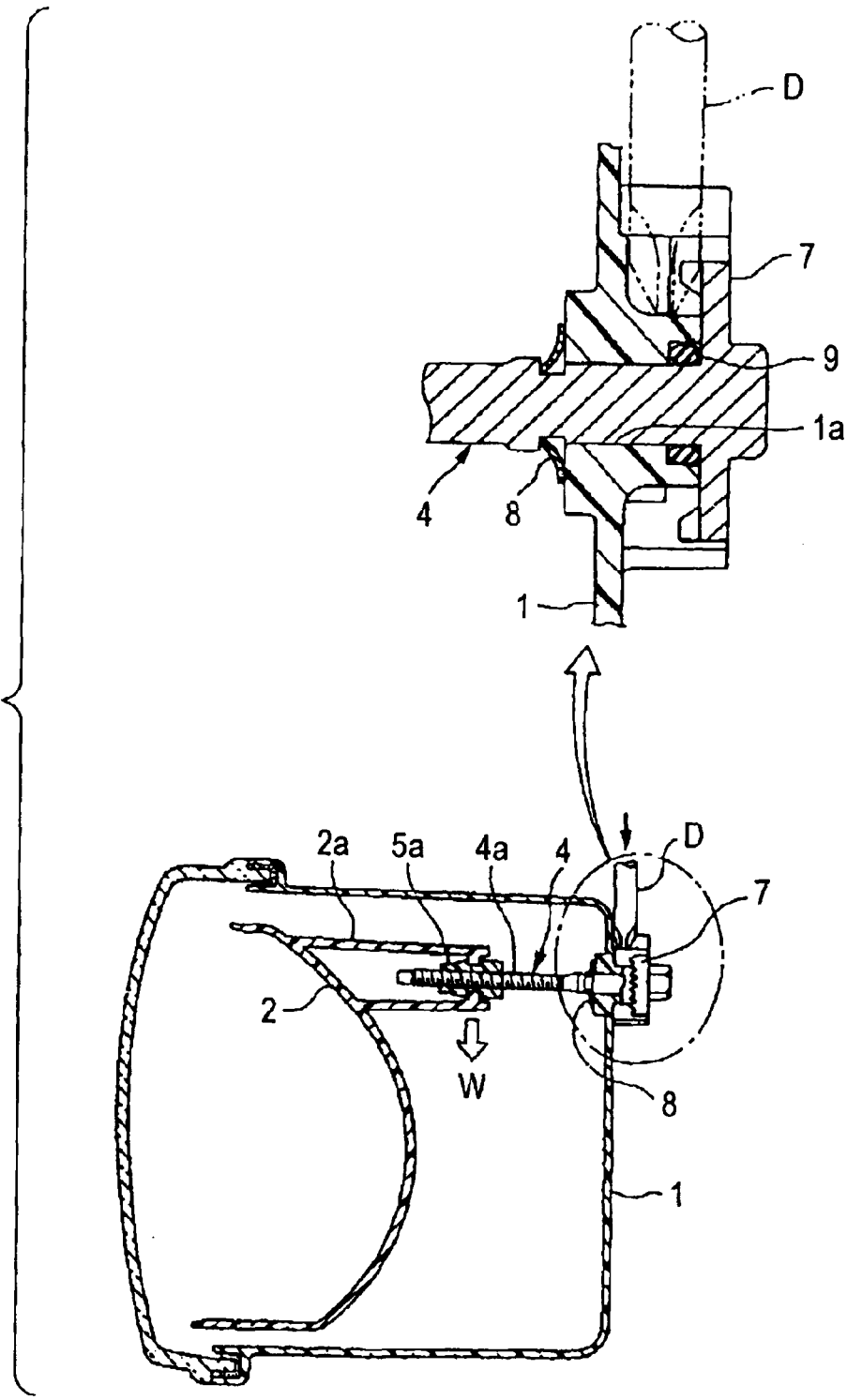
FIG. 30 is a sectional view showing the periphery of the rotating support portion of an aiming screw according to the related art.
Figure 31:
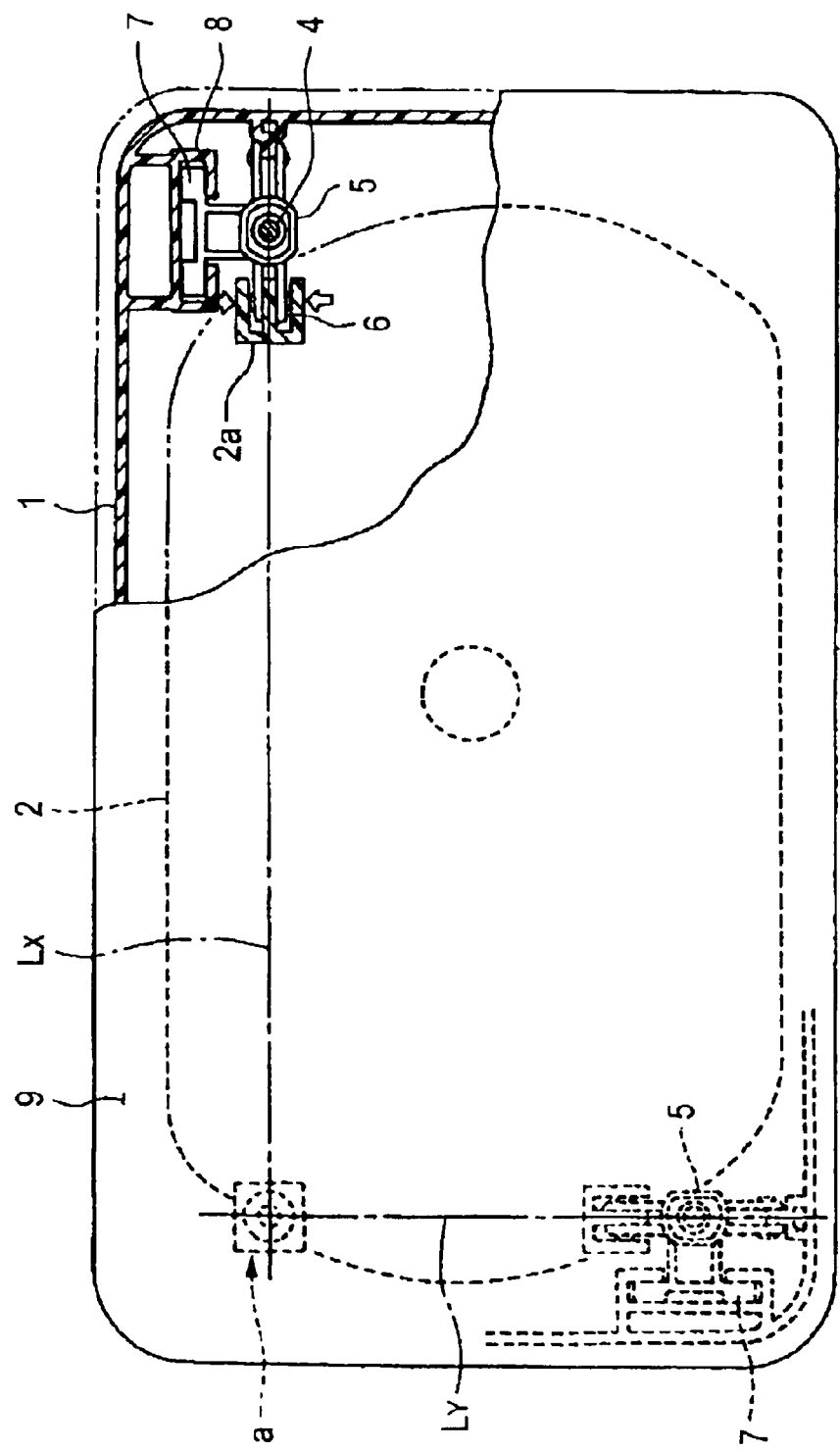
FIG. 31 is a front view showing a headlamp for a vehicle according to a former application.
Figure 32:
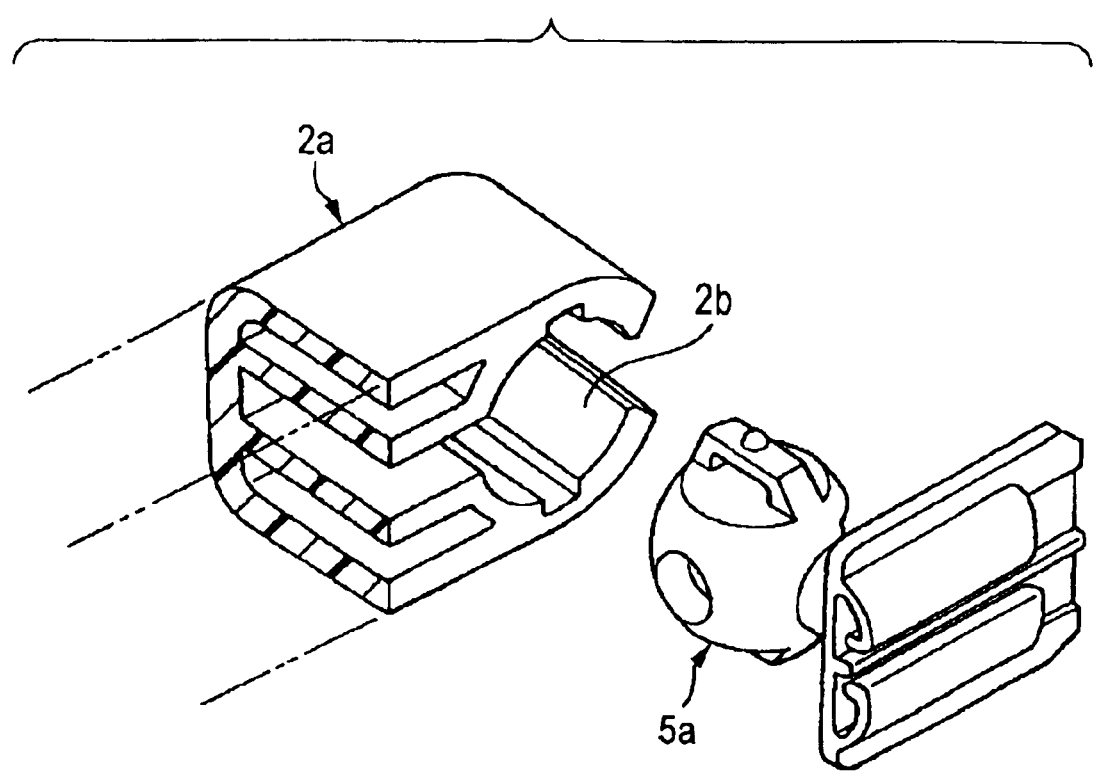
FIG. 32 is a front view showing a headlamp for a vehicle according to another former application.

FIGS. 27 to 29 show a third embodiment of the invention.

While there has been described the headlamp comprising the aiming mechanism E serving as the autoleveling mechanism in which the aiming fulcrum P is provided below the left corner of the reflector 14, the vertical and transverse aiming point P1 is provided on the upper right corner and the vertical aiming point P2 is provided on the upper left corner in the first and second embodiments, in this third embodiment, there is provided an aiming mechanism E1 in which the aiming fulcrum P is provided on the upper left corner of the reflector 14, a transverse aiming point P3 is provided on an upper right corner and a vertical aiming point P4 is provided on a lower left corner.

The aiming fulcrum P is constituted by a ball-and-socket joint 120 including a cylindrical ball receiving portion 124 protruded toward the inside of a lamp body 10 and a ball portion 122 protruded to a bracket 150c (not shown) at the reflector 14 side taking the shape of a paraboloid.

On the transverse aiming point P3, a bearing 160A is inserted and attached into an insertion hole 150a1 of a bracket 150a such that a ball receiving portion 162 having a U-shaped section is opened toward the side. A slider 137 of a nut member 130A in which a nut member body 131 to be a ball portion is supported on the ball receiving portion 162 is supported by a sliding guide 230A formed on the right side wall of the lamp body 10 and extended longitudinally.

On the vertical aiming point P4, moreover, a bearing 160B is inserted and attached into an insertion hole 150b1 of a bracket 150b such that the ball receiving portion 162 having the U-shaped section is opened downward. The slide 137 of a nut member 130B in which the nut member body 131 to be the ball portion is supported on the ball receiving portion 162 is supported by a sliding guide 230B formed on the lower side wall of the lamp body 10 and extended longitudinally.

Furthermore, a lateral width d1 of the bearing insertion hole 150a1 on the transverse aiming point P3 is greater than a lateral width d2 of the plug 168 of the bracket 160A as shown in FIG. 28 in the same manner as in the bracket insertion hole 150a1 on the aiming point P1 according to the first embodiment, and the bearing 160A slides in the transverse direction against an acting load so that an unexpected stress is not generated in a bearing attachment portion on the transverse aiming point P3.

Moreover, a vertical width d3 of the bearing insertion hole 150b1 on the vertical aiming point P4 is greater than a vertical width (which is equal to the lateral width of the plug 168 of the bracket 160A) d2 of the plug 168 as shown in FIG. 29, and the bearing 160B slides in the vertical direction against an acting load so that an unexpected stress is not generated in a bearing attachment portion on the vertical aiming point P4.

In the two embodiments described above, the lamp body 10 is constituted by a polypropylene resin, and the aiming screws 30 and 40 have a proper elasticity and an excellent abrasion resistance, and furthermore, are constituted by a polyacetal resin having an excellent sliding property with the polypropylene resin and may be constituted by a nylon resin in place of the polyacetal resin.

Moreover, while the description has been given that the aiming screws 30 and 40 are formed of a synthetic resin in the embodiments described above, at least the supported portion 34 (44) may be formed of a synthetic resin and other portions may be formed of another material, for example, metal. Furthermore, it is also possible to obtain a structure in which the aiming screws 30 and 40 are formed of metal and the force for holding the aiming screws 30 and 40 by the push-on-fix is reduced to enhance the rotating property of the aiming screws 30 and 40.

EFFECT OF THE INVENTION

As is apparent from the above description, according to the reflector movable type headlamp for a vehicle in accordance with the first aspect of the invention, the weight load on the reflector side does not act as a bending moment on the aiming screw and does not act as a torsional moment on the nut member. Therefore, the vibration of the reflector is reliably suppressed so that proper aiming can be guaranteed. By properly setting the force for holding the aiming screw in the rotating support portion, moreover, the rotating operation of the aiming screw can be carried out smoothly and lightly.

Moreover, the nut member may be made compact. By causing the lamp body to approach the reflector, therefore, the size of the whole headlamp can be reduced correspondingly.

In addition, the structure of the reflector is simplified. Therefore, the reflector can easily be manufactured and the cost of the reflector can be reduced correspondingly, and furthermore, the cost of the headlamp assembly can also be reduced.

According to the second aspect of the invention, the ball portion of the nut member can easily be engaged with and held in the ball receiving portion of the bearing. Therefore, it is possible to easily assemble the reflector through the aiming mechanism.

Moreover, the nut member has a small longitudinal length and the installation space of the nut member can be reduced correspondingly. Consequently, the degree of freedom of the layout of the aiming mechanism can be increased.

According to the third aspect of the invention, the bearing and the nut member are fixed in the circumferential direction of the aiming screw so that the aiming point can precisely slide firmly. Consequently, smooth aiming can be carried out.

According to the fourth aspect of the invention, the nut member has a small lateral length and the installation space of the nut member can be reduced correspondingly. Therefore, the degree of freedom of the layout of the aiming mechanism can be increased.

According to the fifth aspect of the invention, the ball portion of the nut member can easily be engaged with and held in the ball receiving portion of the bearing. Therefore, it is possible to easily assemble the reflector through the aiming mechanism.

Moreover, a pair of division molded members constituting the bearing are connected and integrated through the thin hinge, and management and storage have no drawback.

According to the sixth aspect of the invention, the nut sliding guide corresponding to a pair of left and right aiming points carries the weight of the reflector and suppresses the vibrations in the vertical and transverse directions of the reflector. Consequently, proper autoleveling can be maintained by the smooth tilt of the reflector around the leveling axis.

According to the seventh aspect of the invention, the nut sliding guide corresponding to the left and right aiming points carries the weight of the reflector and suppresses the vibration in the vertical direction of the reflector, and the nut sliding guide corresponding to the vertical aiming point suppresses the vibration in the transverse direction of the reflector. Therefore, the vibration of the reflector is effectively suppressed so that proper light distribution can be obtained and smooth aiming can be carried out by the light rotation of the aiming screw.

What is claimed is:

1. A reflector movable type headlamp for a vehicle comprising:

a lamp body including a screw insertion hole;

a front lens assembled into a front opening of the lamp body in order to constitute a lamp housing;

a reflector accommodated in the lamp housing; and an aiming mechanism to tiltably support the reflector with respect to the lamp body, the aiming mechanism including:

an aiming fulcrum forming a tilt fulcrum of the reflector, an aiming screw supported rotatably on the screw insertion hole, and a nut member attached to a bracket on a reflector side, screwed into the aiming screw and longitudinally advancing and retreating in cooperation with rotation of the aiming screw;

a nut sliding guide extended in parallel with the aiming screw to carry and support the nut member slidably in a longitudinal direction being extended integrally with the lamp body, an attachment portion of the nut member constituting an aiming point and the bracket being provided with stress releasing means having a ball-and-socket joint structure for releasing a stress generated in the attachment portion with advance and retreat of the nut member, wherein the nut member has such a structure that a nut member body itself provided with a female screw portion constitutes a ball portion of the ball-and-socket joint structure and a slider to be supported by the nut sliding guide is formed integrally in a position offset toward a side of the nut member body; and a bearing attached to the bracket and provided with a longitudinal through hole for avoiding an interference of a ball receiving portion for supporting the ball portion with the aiming screw.

2. The reflector movable type headlamp for a vehicle according to claim 1, wherein the aiming screw comprises a pair of left and right aiming screws separated from each other above the aiming fulcrum provided therebelow and separated from each other in a transverse direction, and the aiming fulcrum is constituted to advance and retreat in a longitudinal direction by means of an actuator for autoleveling.

3. The reflector movable type headlamp for a vehicle according to claim 1, wherein the aiming screw comprises a vertical aiming screw provided in a position placed apart from the aiming fulcrum in a vertical direction and a transverse aiming screw provided in a position placed apart from the aiming fulcrum in a transverse direction.

4. The reflector movable type headlamp for a vehicle according to claim 1, wherein at least one of the nut member, the bearing, and at least a portion of the aiming screw is formed of synthetic resin.

5. The reflector movable type headlamp for a vehicle according to claim 1, wherein the bearing is attached to the bracket by elastic hooks.

6. The reflector movable type headlamp for a vehicle according to claim 1, wherein the bearing and bracket are formed of two different materials.

7. The reflector movable type headlamp for a vehicle according to claim 1, wherein the ball receiving portion of the bearing is formed to have a U-shaped longitudinal section opened to a side, the slider is provided through a bar-shaped extended portion extended to the side of the nut member body, an elastic hook to be engaged with a peripheral edge portion of a hole provided on a bottom of the ball receiving portion to prevent the nut member from slipping off from the bearing is extended on an opposite side to the side on which the slider is formed with the female screw portion of the nut member body itself interposed therebetween, and the nut member is pressed from the elastic hook side into the ball receiving portion so that the ball portion to be the nut member body can be engaged with and held in the ball receiving portion of the bearing.

8. The reflector movable type headlamp for a vehicle according to claim 7, wherein a spherical inner peripheral surface to be matched with a spherical outer peripheral surface of the ball portion of the nut member body is formed on an inside of the ball receiving portion, and a gate rib fitted movably in a direction of a groove width in a groove extended in a press direction of the nut member formed on the inside of the ball receiving portion and coming in pressure contact in a direction of a groove depth is protruded across the female screw portion in an opposed position orthogonal to an extending longitudinal direction of the elastic hook on an outer side surface of the nut member body and interposing the female screw portion therebetween.

9. The reflector movable type headlamp for a vehicle according to claim 1, wherein the slider is provided behind the nut member body to be the ball portion through an L-shaped extended portion, and the bearing is formed by a hollow container member provided, on a rear end side, with a ball receiving portion for preventing the ball portion from slipping off, reducing a diameter rearward and being thus opened to be movably fitted in the L-shaped extended portion of the nut member, and constituted by a pair of division molded members which are obtained by a longitudinal division along a longitudinal through hole of the hollow container member and that are integrated as the bearing by matching divided surfaces with each other.

10. The reflector movable type headlamp for a vehicle according to claim 9, wherein respective front ends of the division molded members are coupled to each other through a thin hinge, and a concavo-convex lance engagement portion for integrating the division molded members as the bearing is provided on the corresponding matched surfaces of the division molded members.

* * * * *